US010706325B2

(12) United States Patent
Lamburt et al.

(10) Patent No.: US 10,706,325 B2
(45) Date of Patent: Jul. 7, 2020

(54) METHOD AND APPARATUS FOR SELECTING A NETWORK RESOURCE AS A SOURCE OF CONTENT FOR A RECOMMENDATION SYSTEM

(71) Applicant: YANDEX EUROPE AG, Lucerne (CH)

(72) Inventors: Victor Grigorievich Lamburt, Moscow (RU); Igor Igorevich Lifar, Krasnodar region (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/606,326

(22) Filed: May 26, 2017

(65) Prior Publication Data

US 2018/0014038 A1 Jan. 11, 2018

(30) Foreign Application Priority Data

Jul. 7, 2016 (RU) ................. 2016127446

(51) Int. Cl.
*G06K 9/62* (2006.01)
*H04L 12/927* (2013.01)
(Continued)

(52) U.S. Cl.
CPC ....... *G06K 9/6256* (2013.01); *G06F 16/9535* (2019.01); *H04L 47/80* (2013.01); *H04N 21/251* (2013.01)

(58) Field of Classification Search
CPC ............... G06F 17/30; G06F 17/30699; G06F 17/30867; H04N 21/251
See application file for complete search history.

(56) References Cited

U.S. PATENT DOCUMENTS 7,007,242 B2 2/2006 Suomela et al.
7,328,216 B2 2/2008 Hofmann et al.
(Continued)

FOREIGN PATENT DOCUMENTS

CN 103077220 A 5/2013
CN 103167330 A 6/2013
(Continued)

OTHER PUBLICATIONS

European Search Report dated Sep. 14, 2017 with regard to the counterpart patent application EP 17 18 0212.
(Continued)

*Primary Examiner* — Gregory B Sefcheck
*Assistant Examiner* — Debebe A Asefa
(74) *Attorney, Agent, or Firm* — BCF LLP

(57) ABSTRACT

There are disclosed a method of and a system for selecting a network resource as a source of a content item, the content item to be analyzed by a recommendation system as part of a plurality of content items to generate a set of recommended content items as a recommendation for a given user of the recommendation system. The method comprises, for a network resource, receiving, by the server, a plurality of features associated with a network resource to be processed; generating given network resource profile for the network resource, the given network resource profile being based on the plurality of features; executing a machine learning algorithm in order to determine a source suitability parameter for the network resource, selecting at least one content item from the network resource if the source suitability parameter is determined to be above a pre-determined threshold.

19 Claims, 5 Drawing Sheets

(51) Int. Cl.
*G06F 16/9535* (2019.01)
*H04N 21/25* (2011.01)

(56) References Cited

U.S. PATENT DOCUMENTS

| | | | |
|---|---|---|---|
| 7,502,789 | B2 | 3/2009 | Yao et al. |
| 7,540,051 | B2 * | 6/2009 | Gundersen ............ G06F 16/951 |
| D607,463 | S | 1/2010 | Krieter et al. |
| 7,685,200 | B2 | 3/2010 | Gunawardena et al. |
| D613,300 | S | 4/2010 | Chaudhri |
| 7,849,076 | B2 | 12/2010 | Zheng et al. |
| 8,010,527 | B2 | 8/2011 | Denoue et al. |
| 8,244,740 | B2 | 8/2012 | Gruenhagen et al. |
| 8,271,898 | B1 | 9/2012 | Mattos et al. |
| 8,285,602 | B1 | 10/2012 | Yi et al. |
| 8,290,818 | B1 | 10/2012 | Levitan et al. |
| 8,301,623 | B2 | 10/2012 | Chakrabarti et al. |
| 8,386,955 | B1 | 2/2013 | Weber et al. |
| 8,412,726 | B2 | 4/2013 | Yan et al. |
| 8,429,184 | B2 | 4/2013 | Ismalon |
| D682,844 | S | 5/2013 | Friedlander et al. |
| 8,478,664 | B1 | 7/2013 | Xavier et al. |
| 8,478,750 | B2 | 7/2013 | Rao et al. |
| 8,510,252 | B1 | 8/2013 | Gargi et al. |
| D691,619 | S | 10/2013 | Satterfield et al. |
| D693,833 | S | 11/2013 | Inose et al. |
| 8,600,968 | B2 | 12/2013 | Holenstein et al. |
| 8,606,792 | B1 | 12/2013 | Jackson et al. |
| 8,676,736 | B2 | 3/2014 | Pilaszy et al. |
| 8,683,374 | B2 | 3/2014 | Vaughan et al. |
| 8,712,937 | B1 | 4/2014 | Bacus et al. |
| 8,751,507 | B2 | 6/2014 | Kim et al. |
| 8,869,042 | B2 | 10/2014 | Kast |
| 8,886,797 | B2 | 11/2014 | Gannu et al. |
| 8,893,042 | B2 | 11/2014 | Laurie et al. |
| 8,893,043 | B2 | 11/2014 | Dodson et al. |
| 8,903,834 | B2 | 12/2014 | Ciancutti et al. |
| 8,910,070 | B2 | 12/2014 | Goodger et al. |
| 8,914,399 | B1 | 12/2014 | Paleja et al. |
| 8,972,391 | B1 | 3/2015 | McDonnell et al. |
| 8,972,865 | B2 | 3/2015 | Hansen et al. |
| 8,983,888 | B2 | 3/2015 | Nice et al. |
| 8,996,530 | B2 | 3/2015 | Luvogt et al. |
| 9,053,416 | B1 | 6/2015 | De Leo et al. |
| D733,747 | S | 7/2015 | Jeong et al. |
| 9,098,248 | B2 | 8/2015 | Suzuki et al. |
| 9,098,551 | B1 | 8/2015 | Fryz et al. |
| 9,122,989 | B1 | 9/2015 | Morris et al. |
| D751,570 | S | 3/2016 | Lee et al. |
| D751,571 | S | 3/2016 | Lee et al. |
| D751,572 | S | 3/2016 | Lee et al. |
| D752,601 | S | 3/2016 | Lam |
| D752,636 | S | 3/2016 | Yoon et al. |
| D755,805 | S | 5/2016 | Zankowski et al. |
| D755,806 | S | 5/2016 | Zankowski et al. |
| D755,832 | S | 5/2016 | Liu et al. |
| D757,788 | S | 5/2016 | Shrivastava |
| 9,348,898 | B2 | 5/2016 | Nice et al. |
| 9,396,258 | B2 | 7/2016 | Chu et al. |
| 9,405,741 | B1 | 8/2016 | Schaaf et al. |
| D766,274 | S | 9/2016 | Che et al. |
| 9,471,671 | B1 | 10/2016 | Juang et al. |
| 9,473,803 | B2 | 10/2016 | Wang |
| 9,569,785 | B2 | 2/2017 | Alon et al. |
| 9,582,767 | B2 | 2/2017 | Somekh et al. |
| 9,660,947 | B1 | 5/2017 | Hart |
| 9,703,783 | B2 | 7/2017 | Yi et al. |
| 9,785,883 | B2 | 10/2017 | Luvogt et al. |
| 9,836,533 | B1 | 12/2017 | Levi et al. |
| 9,836,765 | B2 | 12/2017 | Hariri et al. |
| 9,846,836 | B2 | 12/2017 | Gao et al. |
| D806,723 | S | 1/2018 | Gussev et al. |
| 9,900,659 | B1 | 2/2018 | Norum et al. |
| D828,369 | S | 9/2018 | Arutyunyan et al. |
| D847,163 | S | 4/2019 | Matsumura |
| 2002/0054164 | A1 | 5/2002 | Uemura |
| 2002/0198882 | A1 | 12/2002 | Linden et al. |
| 2004/0158497 | A1 | 8/2004 | Brand |
| 2004/0260621 | A1 | 12/2004 | Foster et al. |
| 2005/0076365 | A1 | 4/2005 | Popov et al. |
| 2005/0097190 | A1 | 5/2005 | Abdelhak |
| 2006/0031114 | A1 | 2/2006 | Zommers |
| 2006/0041548 | A1 | 2/2006 | Parsons et al. |
| 2006/0293065 | A1 | 12/2006 | Chew et al. |
| 2008/0134043 | A1 | 6/2008 | Georgis et al. |
| 2008/0222132 | A1 | 9/2008 | Pan et al. |
| 2008/0243733 | A1 | 10/2008 | Black |
| 2008/0250039 | A1 | 10/2008 | Franks et al. |
| 2008/0256017 | A1 | 10/2008 | Murakami |
| 2008/0266289 | A1 | 10/2008 | Park |
| 2008/0294617 | A1 | 11/2008 | Chakrabarti et al. |
| 2009/0006371 | A1 | 1/2009 | Denoue |
| 2009/0006373 | A1 | 1/2009 | Chakrabarti et al. |
| 2009/0055385 | A1 | 2/2009 | Jeon et al. |
| 2009/0150935 | A1 | 6/2009 | Peters et al. |
| 2009/0163183 | A1 | 6/2009 | O'Donoghue et al. |
| 2009/0199113 | A1 | 8/2009 | McWhinnie et al. |
| 2009/0249217 | A1 | 10/2009 | Narayanaswami |
| 2009/0276368 | A1 | 11/2009 | Martin et al. |
| 2009/0327941 | A1 | 12/2009 | Fong et al. |
| 2010/0050067 | A1 | 2/2010 | Curwen et al. |
| 2010/0070454 | A1 | 3/2010 | Masuda et al. |
| 2010/0070928 | A1 | 3/2010 | Goodger et al. |
| 2010/0131844 | A1 | 5/2010 | Wohlert |
| 2010/0175018 | A1 | 7/2010 | Petschnigg et al. |
| 2010/0205542 | A1 | 8/2010 | Walman |
| 2010/0251304 | A1 * | 9/2010 | Donoghue ......... H04N 5/44543 725/46 |
| 2010/0312650 | A1 | 12/2010 | Pinckney et al. |
| 2010/0312724 | A1 | 12/2010 | Pinckney et al. |
| 2011/0029636 | A1 | 2/2011 | Smyth et al. |
| 2011/0035388 | A1 | 2/2011 | Im et al. |
| 2011/0047136 | A1 | 2/2011 | Dehn |
| 2011/0047491 | A1 | 2/2011 | Hwang et al. |
| 2011/0066497 | A1 | 3/2011 | Gopinath et al. |
| 2011/0072011 | A1 | 3/2011 | Qiao |
| 2011/0107223 | A1 | 5/2011 | Tilton et al. |
| 2011/0112981 | A1 | 5/2011 | Park et al. |
| 2011/0125763 | A1 | 5/2011 | Takanen et al. |
| 2011/0179081 | A1 | 7/2011 | Ovsjanikov et al. |
| 2011/0208732 | A1 | 8/2011 | Melton et al. |
| 2011/0213761 | A1 | 9/2011 | Song et al. |
| 2011/0246406 | A1 | 10/2011 | Lahav et al. |
| 2011/0252050 | A1 | 10/2011 | Palleti et al. |
| 2011/0258185 | A1 | 10/2011 | Acharya et al. |
| 2011/0302117 | A1 | 12/2011 | Pinckney et al. |
| 2011/0302158 | A1 | 12/2011 | Sanders |
| 2011/0320450 | A1 | 12/2011 | Liu et al. |
| 2012/0030159 | A1 | 2/2012 | Pilaszy et al. |
| 2012/0054794 | A1 | 3/2012 | Kim et al. |
| 2012/0059707 | A1 | 3/2012 | Goenka et al. |
| 2012/0143871 | A1 | 6/2012 | Liebald et al. |
| 2012/0158685 | A1 | 6/2012 | White et al. |
| 2012/0159337 | A1 | 6/2012 | Travilla et al. |
| 2012/0191776 | A1 | 7/2012 | Ruffner et al. |
| 2012/0209907 | A1 | 8/2012 | Andrews et al. |
| 2012/0254097 | A1 | 10/2012 | Flinn et al. |
| 2012/0278767 | A1 | 11/2012 | Stibel et al. |
| 2012/0304073 | A1 | 11/2012 | Mandic et al. |
| 2012/0317104 | A1 | 12/2012 | Radlinski et al. |
| 2012/0323349 | A9 | 12/2012 | Khedouri et al. |
| 2013/0009990 | A1 | 1/2013 | Hsu et al. |
| 2013/0024471 | A1 | 1/2013 | Mitrovic |
| 2013/0031090 | A1 | 1/2013 | Posse et al. |
| 2013/0041896 | A1 | 2/2013 | Ghani et al. |
| 2013/0046772 | A1 | 2/2013 | Gu et al. |
| 2013/0047112 | A1 | 2/2013 | Waeller |
| 2013/0073988 | A1 | 3/2013 | Groten et al. |
| 2013/0080968 | A1 | 3/2013 | Hanson et al. |
| 2013/0111395 | A1 | 5/2013 | Ying et al. |
| 2013/0132515 | A1 | 5/2013 | Mostafa et al. |
| 2013/0158693 | A1 | 6/2013 | Beckmann et al. |
| 2013/0159243 | A1 | 6/2013 | Wei et al. |
| 2013/0179252 | A1 | 7/2013 | Dong et al. |

(56) References Cited

U.S. PATENT DOCUMENTS

| | | |
|---|---|---|
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0052003 A1 | 2/2015 | Tang et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1* | 11/2015 | Raichelgauz ....... G06F 17/3002 707/706 |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | Macadaan et al. |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0274744 A1 | 9/2016 | Neumann et al. |
| 2016/0275804 A1 | 9/2016 | Koppel et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |
| 2017/0124093 A1 | 5/2017 | Carbonell et al. |
| 2017/0132230 A1 | 5/2017 | Muralidhar et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0012236 A1 | 1/2018 | Zhuo et al. |
| 2018/0014038 A1 | 1/2018 | Lamburt et al. |
| 2018/0020258 A1 | 1/2018 | Jeon et al. |
| 2018/0075137 A1 | 3/2018 | Lifar |
| 2018/0096388 A1 | 4/2018 | Lu |
| 2019/0069030 A1 | 2/2019 | Jackman et al. |
| 2019/0342616 A1 | 11/2019 | Domm et al. |
| 2020/0090247 A1 | 3/2020 | Sokolov et al. |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |

(56) References Cited

FOREIGN PATENT DOCUMENTS

| | | |
|---|---|---|
| RU | 2451986 C2 | 11/2011 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2629449 C2 | 8/2017 |
| RU | 2632100 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

European Search Report dated Sep. 18, 2017 with regard to the counterpart patent application EP 17 18 0214.

Office Action with regard to the counterpart U.S. Appl. No. 15/263,493 dated May 9, 2019.

Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).

Office Action with regard to the counterpart U.S. Appl. No. 15/262,318 dated Apr. 1, 2019.

English abstract of CN 103838842 retrieved from Espacenet on Feb. 3, 2017.

Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.

Mozilla / newnewtab, https://github.com/mozilla/newnewtab, retrieved on Nov. 11, 2016, 2 pages.

Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.

Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.

Opera Help, Speed Dial, http://help.opera.com/Windows/12.10/en/speeddial.html, retrieved on Nov. 11, 2016, 2 pages.

Sams, Windows 10 build 10120: Microsoft introduces a 'new tab' page for Edge, https://www.neowin.net/news/Windows-10-build-10120-microsoft-introduces-a-039new-tab039-page-for-edge, May 18, 2015, retrieved on Nov. 11, 2016, 4 pages.

Russian Search Report from RU patent application No. 2015141291 dated Nov. 2, 2016.

Extended European Search Report from EP16190997, dated Feb. 16, 2017, Herry, Tzvetanka.

European Search report from EP 16185747, Siodmok, Wojciech, dated Jan. 18, 2017.

English abstract of CN103678672 retrieved from Espacenet on Jan. 20, 2017.

English abstract of CN103077220 retrieved from Espacenet on Jan. 20, 2017.

Russian Search Report dated Nov. 9, 2016 from Russian Patent Application No. 2015136684.

Amatriain et al., System Architectures for Personalization and Recommendation, http://techblog.netflix.com/2013/03/system-architectures-for.html, retrieved on May 30, 2015.

English Abstract of CN303532062 retrieved on Google Translate on Apr. 4, 2017.

Kumar et al., "Knowledge Retrieval from Web Server Logs Using Web Usage Mining", International Journal of Science and Research (IJSR), 2015, vol. 4, Issue 3, pp. 2173-2176.

Kim et al., "Ranking Web Documents with Dynamic Evaluation by Expert Groups", J. Eder and M. Missikoff (Eds.), CAISE, 2003, pp. 437-448.

Russian Search Report from RU patent application No. 2016127447 dated Feb. 7, 2017.

Pilaszy et al., "Fast ALS-based Matrix Factorization for Explicit and Implicit Feedback Datasets", Recsys'10, 2010, pp. 71-78.

U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.

Russian Search Report from RU patent application No. 2015141108 dated Sep. 7, 2016.

U.S. Appl. No. 15/606,658, filed May 26, 2017.
U.S. Appl. No. 15/607,555, filed May 29, 2017.

English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.

Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.

English Abstract for CN103167330 retrieved on Espacenet on May 9, 2018.

Youtube Account: RnStore, "Zmags Demo", (May 19, 2011 ), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.

Youtube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.

Youtube Account: macmostvideo, "Viewing Photos With the Finder (MacMost Now 612)", (Sep. 30, 2011 ), time stamp 2:05-2:25, PDF Attached, URL: https://www.youtube.com/watch?v=tYoJI6G7Hkg, received from USPTO on May 11, 2018 with regard to the U.S. Appl. No. 15/263,493.

Notice of Allowance with regard to the counterpart U.S. Appl. No. 15/262,332 dated Mar. 18, 2019.

(56) References Cited

OTHER PUBLICATIONS

English Abstract for JP2009015834 retrieved on Espacenet on Mar. 21, 2019.
Office Action with regard to the counterpart U.S. Appl. No. 15/592,745 dated Mar. 8, 2019.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
Office Action with regard to the counterpart U.S. Appl. No. 15/262,332 dated Dec. 27, 2018.
English Abstract for CN103473354 retrieved on Espacenet on Jan. 4, 2019.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (Notice of Allowance with regard to the counterpart U.S. Appl. No. 15/592,745 dated Oct. 11, 2018).
Office Action with regard to the counterpart U.S. Appl. No. 15/263,493 dated Nov. 29, 2018.
Notice of Allowance received with regard to the counterpart U.S. Appl. No. 15/606,658 dated Jun. 26, 2019.
European Examination Report with regard to the counterpart patent application No. EP 16190999.9 dated Jun. 29, 2018.
RU Search Report (completion date: May 25, 2017) with regard to the counterpart patent application RU 2016127446.
English Abstract for RU2013101601 retrieved on Espacenet on Nov. 2, 2017.
Notice of Allowance with regard to the counterpart U.S. Appl. No. 16/370,286 dated Mar. 31, 2020.
Office Action with regard to the counterpart U.S. Appl. No. 16/010,152 dated Apr. 7, 2020.
Search Report with regard to the counterpart RU Patent Application No. 2018135362 dated Mar. 26, 2020.
English Abstract for CN104903889 retrieved on Espacenet dated Apr. 16, 2020.
"Browser Amigo by Mail.ru", https://www.youtube.com/watch?y=9IPOwpplcWM accessed on Mar. 9, 2020; https:// Nww.youtube.comiwatch?v=vdxnXZT2tQo accessed on Mar. 9, 2020, pdf 7 pages.
Search Report with regard to the counterpart RU Patent Application No. 2018132708 dated Feb. 18, 2020.
Search Report with regard to the counterpart RU Patent Application No. 2018132713 dated Feb. 21, 2020.
English Abstract for RU2017101241 retrieved on Espacenet dated Mar. 12, 2020.
English Abstract for CN107577682 retrieved on Espacenet dated Mar. 12, 2020.
English Abstract for CN108346072 retrieved on Espacenet dated Mar. 12, 2020.

* cited by examiner

METHOD AND APPARATUS FOR SELECTING A NETWORK RESOURCE AS A SOURCE OF CONTENT FOR A RECOMMENDATION SYSTEM

CROSS-REFERENCE

The present application claims priority to Russian Patent Application No. 2016127446, filed Jul. 7, 2016, entitled "Method And Apparatus For Selecting A Network Resource As A Source Of Content For A Recommendation System" the entirety of which is incorporated herein.

TECHNICAL FIELD

The present technology relates to recommendation systems in general and specifically to a method and apparatus for selecting a network resource as a source of content for a recommendation system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

In order to generate the ranked search results in a search engine system or a list of recommended resources in a typical recommendation system, the respective system utilizes a machine learning algorithm to select search results and/or recommended content. There are several machine learning algorithms known in the art and utilized by search engines and/or recommendation systems. As is known, a typical machine learning algorithm is first "trained" using a training set (whether marked or unmarked) to generate a machine learning algorithm formula, which is then applied to determine at run time an output based on the system inputs.

In the typical recommendation system, the trained machine learning algorithm of the recommendation system selects a number of potential recommended items from a number of potential sources for the recommended items. Typically, the machine learning algorithm associated with such recommendation system, acquires (over time) knowledge about various potential sources of content items, past-user interactions with the various potential sources of content items (as well as generated recommendations) and uses this knowledge to generate a recommendation for a particular user of the recommendation system.

SUMMARY

It is an object of the present technology to ameliorate at least some of the inconveniences present in the prior art.

Embodiments of the present technology have been developed based on developers' appreciation that the machine learning algorithms used for the selection of the recommended content are very computer processing resource consuming. However, the recommendation system needs to output content recommendations relatively fast, when a given user of the recommendation system requests the content recommendations. In other words, developers of the present technology have realized that it may be desirable to move certain tasks of the recommendation system from run time to off line, i.e. to execute them before the given user of the recommendation system has requested the content recommendation.

Developers of the present technology have further appreciated that the volume of potential sources of content recommendations are large. Analyzing all potential sources of content recommendations can take a considerable time and require considerable computing resources. Thus, developers of the present technology have set out to develop a method and a system that pre-qualifies potential sources of content recommendations. The technical result of such pre-qualification is two fold. On the one hand, the pre-qualification of potential sources can be executed offline. And, secondly, content source profile data can be used when the recommendation system is used on a new territory, hence requiring pre-qualification of a large number of potential sources of content recommendations. Embodiments of the present technology are based on developers' premise that certain network resources are better suited to be sources of content recommendations. Without wishing to be bound to any specific theory, developers of the present technology have developed systems and methods that pre-qualify network resources as "potential content sources" (based on the network resource profile), the system utilizing a machine learning algorithm that places a larger weight on those network resources with a "fast paced" content, i.e. content that is frequently updated. These network resources can be (but are not so limited) news aggregators, media content aggregators and the like.

Other embodiments of the present technology aim at developing sources of content recommendations for the given user of the recommendation system. These embodiments analyze user-specific sources of content recommendations (those sources that the given user has interacted in the past) and enrich them with content sources that the given user may not have interacted with in the past. Thus, some embodiments of the present technology enable the recommendation system to mix content recommendation from known sources for the given user and unknown sources, thus enabling the recommendation system to "discover" new sources of recommended content for the given user.

According to a first broad aspect of the present technology, there is provided a method of selecting a network resource as a source of a content item, the content item to be analyzed by a recommendation system as part of a plurality of content items to generate a set of recommended content items as a recommendation for a given user of the recommendation system. The recommendation system is executed at a server coupled to a communication network. The method comprises: acquiring, by the server, an indication of the network resource; receiving, by the server, a plurality of features associated with the network resource; generating, by the server, a given network resource profile for the network resource, the given network resource profile being based on the plurality of features; executing, by the server, a machine learning algorithm in order to, based on the given network resource profile, determine a source suitability parameter for the network resource, the source suitability parameter being indicative of the network resource being susceptible to publishing the content item that can be processed by the recommendation system, selecting at least one content item from the network resource if the source suitability parameter is determined to be above a pre-determined threshold, the at least one content item for submitting to the recommendation system for processing.

In some implementations of the method, the machine learning algorithm having been trained, prior to said acquiring, to determine the source suitability parameter based on training web site profiles generated with an associated plurality of training features at least some of which are of a same category as the plurality of features.

In some implementations of the method, plurality of features includes at least an absolute feature and a relative feature.

In some implementations of the method, the absolute feature and the relative feature are base features and wherein the method further comprises:
generating at least one derivative feature based on at least one of the absolute feature and the relative feature; and wherein
the given web site profile is further based on the at least one derivative feature.

In some implementations of the method, the plurality of features includes an indication of a proportion of visit sources to the network resource.

In some implementations of the method, the plurality of features includes at least one relative feature selected from:
hits per visit (HPV);
sessions per visit (SPV);
dated-pages per visit (DPV);
home page per visit (MPV);
time spent on the network resource (MTIME);
last domain per session (LPS);
first domain per session (FPS);
hits per session (HPS);
visits per user (VPU);
hits per user (HPU);
sessions per user (SPU);
dated-pages per hit (DPH);
home pages per hit (MPH); and
an indication of a visit source being one of:
direct access visit-source (TT_GR);
search engine visit-source (TT_SE);
social network visit-source (TT_SN);
electronic message visit-source (TT_IM);
URL-condenser visit-source (TT_US); and
ad-platform visit-source (TT_AD).

In some implementations of the method, the plurality of features includes at least one of: a number of users visiting the network resource per time interval, number of visits per time interval, number of transitions within various web pages within the network resource per time interval, and a number of unique sessions with the network resource per time interval.

In some implementations of the method, the plurality of features is a subset of all possible features, the method further comprising executing a feature selection to define the subset.

In some implementations of the method, the subset of all possible features consists of:
at least one of: a proportion of a landing page of the network resource visits within an initial transition to the network resource within a session and a proportion of the landing page visits during transitions within the network resource;
at least one of: a proportion of a web page associated with an URL containing a date being a first page visited within the initial transition to the network resource and a proportion of the web pages within the network resource visited during the session, the web pages being associated with an URL containing a date;
a proportionate profile of visit sources for the network resource, the visit sources being selected from: search engine/social networks/mail and messenger application/URL condensers/direct visits;
a proportion of session where the network resource was last in the session.

In some implementations of the method, the source suitability parameter is one of a suitable and non-suitable.

In some implementations of the method, the source suitability parameter is determined using at least one of:
- a logistical regression analysis;
- naive Bayes algorithm;
- k-nearest neighbor algorithm;
- random forest algorithm; and
- hard voting algorithm.

In some implementations of the method, said selecting is executed in response to a request from the given user for a recommendation.

In accordance with another broad aspect of the present technology, there is provided a server. The server comprises:
- a data storage medium;
- a network interface configured for communication over a communication network;
- a processor operationally coupled to the data storage medium and the network interface, the processor being configured to:
  - acquire an indication of the network resource, the network resource to be processed to determine its suitability as a source of a content item, the content item to be analyzed by a recommendation system as part of a plurality of content items to generate a set of recommended content items as a recommendation for a given user of the recommendation system;
  - receive a plurality of features associated with the network resource;
  - generate a given network resource profile for the network resource, the given network resource profile being based on the plurality of features;
  - execute a machine learning algorithm in order to, based on the given network resource profile, determine a source suitability parameter for the network resource, the source suitability parameter being indicative of the network resource being susceptible to publishing the content item that can be processed by the recommendation system,
  - select at least one content item from the network resource if the source suitability parameter is determined to be above a pre-determined threshold, the at least one content item for submitting to the recommendation system for processing.

In some implementations of the server, the machine learning algorithm has been trained, prior to said acquiring, to determine the source suitability parameter based on training web site profiles generated with an associated plurality of training features at least some of which are of a same category as the plurality of features.

In some implementations of the server, the plurality of features includes at least an absolute feature and a relative feature.

In some implementations of the server, the absolute feature and the relative feature are base features and wherein the processor is further configured to:
generate at least one derivative feature based on at least one of the absolute feature and the relative feature; and wherein
the given web site profile is further based on the at least one derivative feature.

In some implementations of the server, the plurality of features includes an indication of a proportion of visit sources to the network resource.

In some implementations of the server, the plurality of features includes at least one relative feature selected from:
- hits per visit (HPV);
- sessions per visit (SPV);
- dated-pages per visit (DPV);
- home page per visit (MPV);
- time spent on the network resource (MTIME);
- last domain per session (LPS);
- first domain per session (FPS);
- hits per session (HPS);
- visits per user (VPU);
- hits per user (HPU);
- sessions per user (SPU);
- dated-pages per hit (DPH);
- home pages per hit (MPH); and
- an indication of a visit source being one of:
  - direct access visit-source (TT_GR);
  - search engine visit-source (TT_SE);
  - social network visit-source (TT_SN);
  - electronic message visit-source (TT_IM);
  - URL-condenser visit-source (TT_US); and
  - ad-platform visit-source (TT_AD).

In some implementations of the server, the plurality of features includes at least one of: a number of users visiting the network resource per time interval, number of visits per time interval, number of transitions within various web pages within the network resource per time interval, and a number of unique sessions with the network resource per time interval.

In some implementations of the server, the plurality of features is a subset of all possible features, the method further comprising executing a feature selection to define the subset.

In some implementations of the server, the subset of all possible features consists of:
at least one of: a proportion of a landing page of the network resource visits within an initial transition to the network resource within a session and a proportion of the landing page visits during transitions within the network resource;
at least one of: a proportion of a web page associated with an URL containing a date being a first page visited within the initial transition to the network resource and a proportion of the web pages within the network resource visited during the session, the web pages being associated with an URL containing a date;
a proportionate profile of visit sources for the network resource, the visit sources being selected from: search engine/social networks/mail and messenger application/URL condensers/direct visits;
a proportion of session where the network resource was last in the session.

In some implementations of the server, the source suitability parameter is one of a suitable and non-suitable.

In some implementations of the server, the source suitability parameter is determined using at least one of:
- a logistical regression analysis;
- naive Bayes algorithm;
- k-nearest neighbor algorithm;
- random forest algorithm; and
- hard voting algorithm.

In some implementations of the server, the processor executes the selecting in response to a request from the given user for a recommendation.

In accordance with yet another broad aspect of the present technology, there is provided a computer-implemented method of generating a content recommendation for a user of an electronic device. The method is executable by a recommendation server accessible by the electronic device via a communication network, the content recommendation being associated with a content item available at one of a plurality of network resources accessible via the communication network. The method comprises: receiving, from the electronic device, a request for the content recommendation, the content recommendation including at least one recommended content item; executing a first machine learning algorithm module in order to determine a sub-set of recommended content sources from a plurality of possible content sources, the determining the sub-set of recommended content sources including: acquiring an indication of user-past-interactions with at least one of: (i) the recommendation system and (ii) at least some of the plurality of network resources; based on the user-past-interactions, determining a first sub-set of user-specific content sources; based on (i) a machine learning algorithm trained formula of other user interactions with at least some others of the plurality of network resources and at least one of: (ii) the first sub-set of user-specific content sources; and (iii) a user-profile-vector generated based on the user-past-interactions, generating a second sub-set of user-non-specific content sources; processing the first sub-set of user specific content sources and the second sub-set of user-non-specific content sources in order to generate the sub-set of recommended content sources; analyzing the sub-set of recommended content sources to select a plurality of potentially-recommendable content items; executing a second machine learning algorithm module in order to select, from the plurality of potentially-recommendable content items, at least one recommended content item; the selection being made on the basis of the user-profile-vector.

In some implementations of the method, the determining the first sub-set of user-specific content sources comprises applying an SVD algorithm.

In some implementations of the method, the determining the first sub-set of user-specific content sources is based on:

(i) the machine learning algorithm trained formula of other user interactions with at least some others of the plurality of network resources; and (ii) the user-profile-vector generated based on the user-past-interactions.

In some implementations of the method, the method further comprises, prior to the receiving the request for the content recommendation, generating by the SVD algorithm a matrix of network resources events and users.

In some implementations of the method, the determining the first sub-set of user-specific content sources comprises applying a PMI algorithm.

In some implementations of the method, the determining the first sub-set of user-specific content sources is based on:

(i) the machine learning algorithm trained formula of other user interactions with at least some others of the plurality of network resources; and (ii) the first sub-set of user-specific content sources.

In some implementations of the method, the selection from the sub-set of recommended content sources the plurality of potentially-recommendable content items comprises determining a pre-defined number of most recent content items.

In some implementations of the method, the selection from the sub-set of recommended content sources the plurality of potentially-recommendable content items comprises determining a pre-defined number of most popular content items.

In some implementations of the method, the selection from the sub-set of recommended content sources is specific to a geographic region where the request for content recommendation was executed from.

In some implementations of the method, the method further comprises filtering the selected potentially-recommendable content items.

In some implementations of the method, the filtering is based on a language setting of the electronic device and a language setting of the content item.

In accordance with another broad aspect of the present technology, there is provided a server. The server comprises: a data storage medium; a network interface configured for communication over a communication network; a processor operationally coupled to the data storage medium and the network interface, the processor configured to: receive, from an electronic device, a request for the content recommendation, the content recommendation including at least one recommended content item; the content recommendation being associated with a content item available at one of a plurality of network resources accessible via the communication network: execute a first machine learning algorithm module in order to determine a sub-set of recommended content sources from a plurality of possible content sources, the determining the sub-set of recommended content sources including: acquiring an indication of user-past-interactions with at least one of: (i) the recommendation system and (ii) at least some of the plurality of network resources; based on the user-past-interactions, determining a first sub-set of user-specific content sources; based on (i) a machine learning algorithm trained formula of other user interactions with at least some others of the plurality of network resources and at least one of: (ii) the first sub-set of user-specific content sources; and (iii) a user-profile-vector generated based on the user-past-interactions, generating a second sub-set of user-non-specific content sources; processing the first sub-set of user specific content sources and the second sub-set of user-non-specific content sources in order to generate the sub-set of recommended content sources; analyze the sub-set of recommended content sources to select a plurality of potentially-recommendable content items; execute a second machine learning algorithm module in order to select, from the plurality of potentially-recommendable content items, at least one recommended content item; the selection being made on the basis of the user-profile-vector.

In some embodiments of the server, to determine the first sub-set of user-specific content sources, the processor is configured to apply an SVD algorithm.

In some embodiments of the server, the determining the first sub-set of user-specific content sources is based on:

(i) the machine learning algorithm trained formula of other user interactions with at least some others of the plurality of network resources; and (ii) the user-profile-vector generated based on the user-past-interactions.

In some embodiments of the server, the server is further configured, prior to the receiving the request for the content recommendation, to generate, suing the SVD algorithm, a matrix of network resources events and users.

In some embodiments of the server, to determine the first sub-set of user-specific content sources, the processor is configured to apply a PMI algorithm.

In some embodiments of the server, the determining the first sub-set of user-specific content sources is based on:

(i) the machine learning algorithm trained formula of other user interactions with at least some others of the plurality of network resources; and (ii) the first sub-set of user-specific content sources.

In some embodiments of the server, the selection from the sub-set of recommended content sources the plurality of potentially-recommendable content items comprises determining a pre-defined number of most recent content items.

In some embodiments of the server, the selection from the sub-set of recommended content sources the plurality of potentially-recommendable content items comprises determining a pre-defined number of most popular content items.

In some embodiments of the server, the selection from the sub-set of recommended content sources is specific to a geographic region where the request for content recommendation was executed from.

In some embodiments of the server, the processor is further configured to filter the selected potentially-recommendable content items.

In some embodiments of the server, the filtering is based on a language setting of the electronic device and a language setting of the content item.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
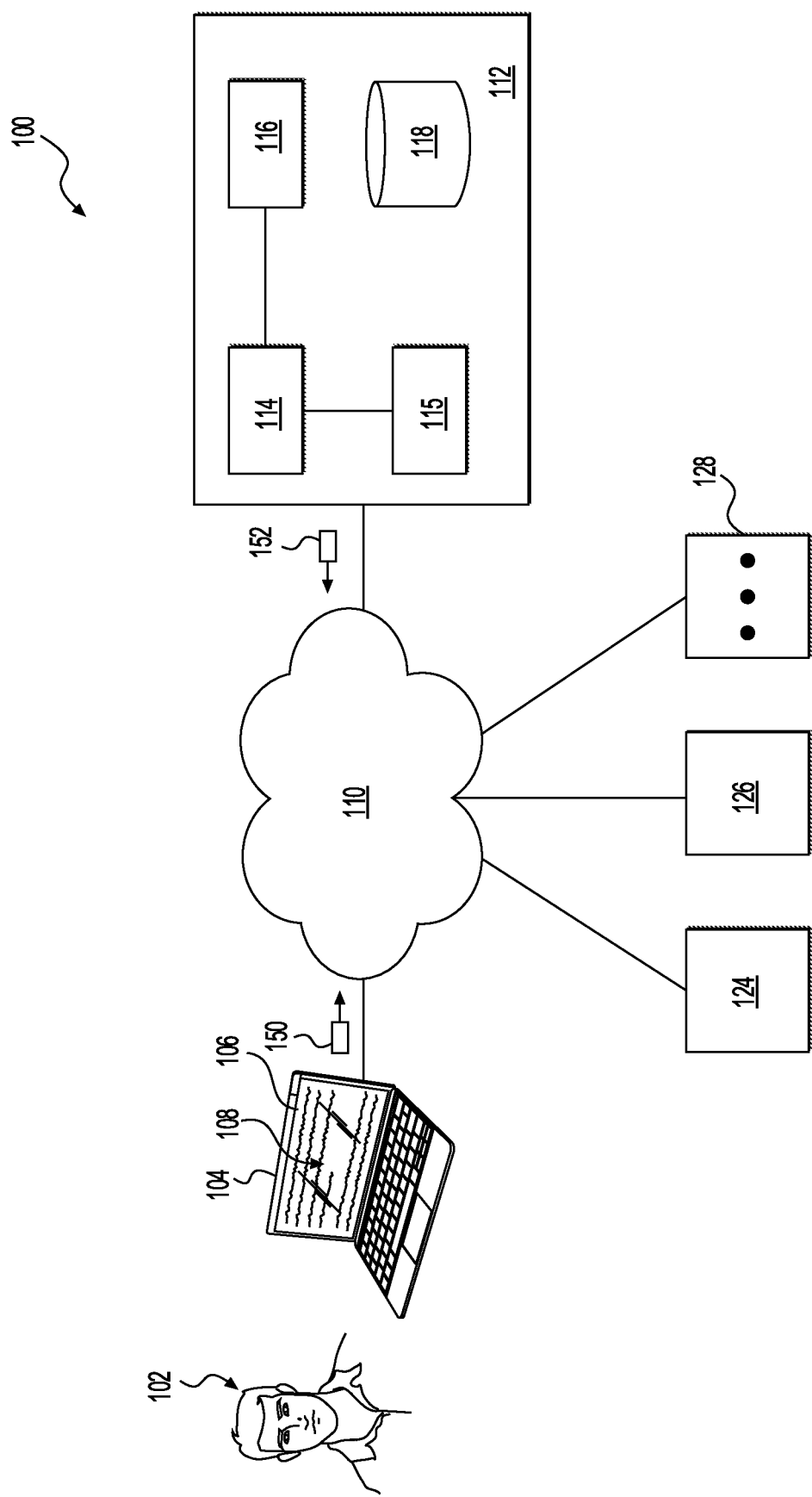
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means.

Figure 2:
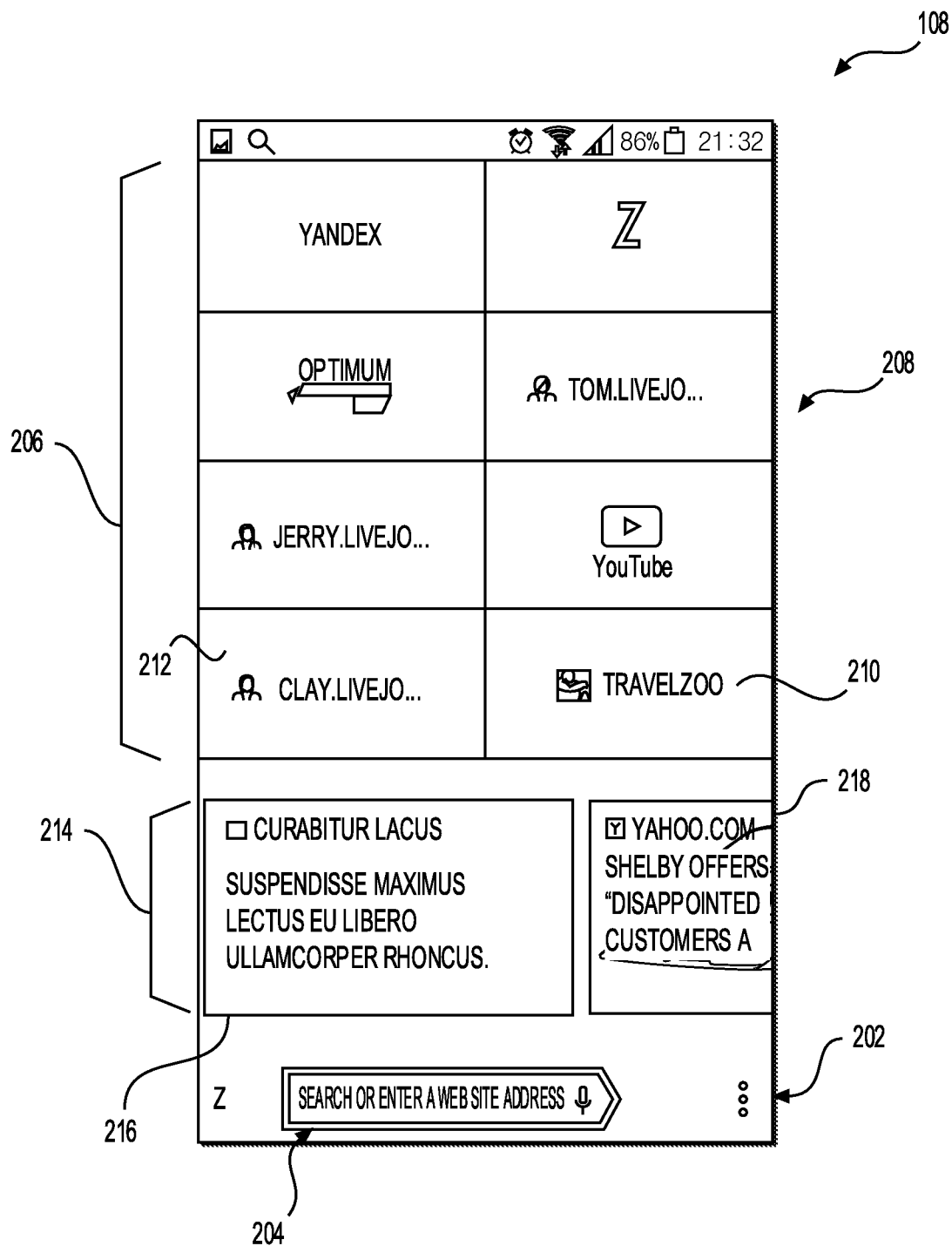
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

Generally speaking, the recommendation application 106 comprises a recommendation interface 108, the recommendation interface 108 being displayed on a screen (not separately numbered) of the electronic device 104. With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 is presented when the user 102 of the electronic device 104 actuates (i.e. executes, run, background-run or the like) the recommendation application 106. Alternatively, the recommendation interface 108 can be presented when the user 102 opens a new browser window and/or activates a new tab in the browser application. For example, in some embodiments of the present technology, the recommendation interface 108 can act as a "home screen" in the browser application.

The recommendation interface 108 includes a search interface 202. The search interface 202 includes a search query interface 204. The search query interface 204 can be implemented as an "omnibox" which allows entry of a search query for executing a search or a network address (such as a Universal Remote Locator) for identifying a network resource (such as a web site) to be accessed. However, the search query interface 204 can be implemented as configured to receive one or both of: entry of the search query for executing the search or the network address (such as a Universal Remote Locator) for identifying the network resource (such as a web site) to be accessed.

The recommendation interface 108 further includes a links interface 206. The links interface 206 includes a plurality of tiles 208—of which eight are depicted in FIG. 2—only two of which are numbered in FIG. 2—a first tile 210 and a second tile 212.

Using the example of the first tile 210 and the second tile 212—each of the plurality of tiles 208 includes (or acts as) a link to either (i) a web site marked as "favorite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 can be different. As such, some or all of the plurality of tiles 208 can be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 can be pre-selected by the provider of the recommendation application 106. In some embodiments of the present technology, the number of tiles within the plurality of tiles 208 is pre-selected based on the size and/or resolution of the screen of the electronic device 104 executing the recommendation application 106. For example, a first number of tiles can be pre-selected for the electronic device 104 executed as a smartphone, a second number of tiles can be pre-selected for the electronic device 104 executed as a tablet, and a third number of tiles can be pre-selected for the electronic device 104 executed as a laptop or desktop computer.

The recommendation interface 108 further includes a recommended content set 214. The recommended content set 214 includes one or more recommended content items, such as a first recommended content item 216 and a second recommended content item 218 (the second recommended content item 218 only partially visible in FIG. 2). Naturally, the recommended content set 214 can have more recommended content items. In the embodiment depicted in FIG. 2 and in those embodiments where more than one recommended content item are present, the user 102 can scroll through the recommended content set 214. The scrolling can be achieved by any suitable means. For example, the user 102 can scroll the content of the recommended content set 214 by means of actuating a mouse device (not depicted), a key board key (not depicted) or interacting with a touch sensitive screen (not depicted) of or associated with the electronic device 104.

Example provided in FIG. 2 is just one possible implementation of the recommendation interface 108. Another example of the implementation of the recommendation interface 108, as well as an explanation of how the user 102 can interact with the recommendation interface 108 is disclosed in a co-owned Russian Patent Application entitled A COMPUTER-IMPLEMENTED METHOD OF GENERATING A CONTENT RECOMMENDATION INTERFACE, filed on May 12, 2016 and bearing an application number 2016118519; content of which is incorporated by reference herein in its entirety.

How the content for the recommended content set 214 is generated will be described in greater detail herein below.

Returning to the description of FIG. 1, the electronic device 104 is communicatively coupled to a communication network 110 for accessing a recommendation server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The recommendation server 112 can be implemented as a conventional computer server. In an example of an embodiment of the present technology, the recommendation server 112 can be implemented as a Dell™ PowerEdge™ Server running the Microsoft™ Windows Server™ operating system. Needless to say, the recommendation server 112 can be implemented in any other suitable hardware, software, and/or firmware, or a combination thereof. In the depicted non-limiting embodiments of the present technology, the recommendation server 112 is a single server. In alternative non-limiting embodiments of the present technology, the functionality of the recommendation server 112 may be distributed and may be implemented via multiple servers.

The recommendation server 112 comprises a processing module 114. The processing module 114 is coupled to or otherwise has access to a content source selection module 116. The content source selection module 116 has access to a data storage device 118. The processing module 114 is further coupled to a content recommendation selection module 115. Operation of the recommendation server 112 and its components will be described herein below in greater detail.

Also coupled to the communication network 110 are multiple network resources, including a first network resource 124, a second network resource 126 and a plurality of additional network resources 128. The first network resource 124, the second network resource 126 and the plurality of additional network resources 128 are all network resources accessible by the electronic device 104 (as well as other electronic devices potentially present in the system 100) via the communication network 110. Respective content of first network resource 124, the second network resource 126 and the plurality of additional network resources 128 is not particularly limited. A given one of the first network resource 124, the second network resource 126 and the plurality of additional network resources 128 can contain (or in other words, host) digital content such as: audio content for streaming, video content for streaming, news, blogs, information about various government institutions, information about points of interest, thematically clustered content (such as content relevant to those interested in kick-boxing), and the like.

The content is potentially "discoverable" to the electronic device 104 by various means. For example, the user 102 of the electronic device 104 can use a browser application (not depicted) and enter a Universal Resource Locator (URL) associated with the given one of the first network resource 124, the second network resource 126 and the plurality of additional network resources 128. Alternatively, the user 102 of the electronic device 104 can execute a search using a search engine (not depicted) to discover the content of one or more of the first network resource 124, the second network resource 126 and the plurality of additional network resources 128. As has been mentioned above, these are useful when the user 102 knows a priori which content the user 102 is interested in.

In accordance with embodiments of the present technology, the recommendation application 106 can recommend content items available from the given one of the first network resource 124, the second network resource 126 and the plurality of additional network resources 128 to the user 102, the content items that the user 102 may not apriori know about. The recommendation server 112 is configured to select content for the one or more recommendation items to be presented to the user 102 via the recommendation application 106. More specifically, the processing module 114 is configured to (i) receive from the electronic device 104 a request for the content recommendation 150 and (ii) responsive to the request, generate a recommended content message 152 specifically customized for the user 102 associated with the electronic device 104. The processing module 114 can further coordinate execution of various routines described herein as performed by the given one of the first network resource 124, the second network resource 126 and the plurality of additional network resources 128 and the content source selection module 116, for example.

In some embodiments of the present technology, the request for the content recommendation 150 can be generated in response to the user 102 providing an explicit indication of the user desire to receive the content recommendation. For example, the recommendation interface 108 can provide a button (or another actuatable element) to enable the user 102 to indicate her/his desire to receive a new or an updated content recommendation. As a non-limiting example, the recommendation interface 108 can provide an actuatable button that reads "Request a content recommendation". Within these embodiments, the request for the content recommendation 150 can be thought of as "an explicit request" in a sense of the user 102 expressly providing a request for the recommended content.

In other embodiments, the request for the content recommendation 150 can be generated in response to the user 102 providing an implicit indication of the user desire to receive the content recommendation. In some embodiments of the present technology, the request for the content recommendation 150 can be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO!™ browser or any other proprietary or commercially available browser application), the request for content recommendation 150 can be generated in response to the user 102 opening the browser application and can be generated, for example, without the user 102 executing any additional actions other than activating the browser application. As another example, the request for content recommendation 150 can be generated in response to the user 102 opening a new tab of the already-opened browser application and can be generated, for example, without the user 102 executing any additional actions other than activating the new browser tab. In other words, the request for the content recommendation 150 can be generated even without the user 102 knowing that the user 102 may be interested in obtaining a content recommendation.

As another example, the request for content recommendation 150 can be generated in response to the user 102 selecting a particular element of the browser application and can be generated, for example, without the user 102 executing any additional actions other than selecting/activating the particular element of the browser application.

Examples of the particular element of the browser application include but are not limited to:
An address line of the browser application bar
A search bar of the browser application and/or a search bar of a search engine web site accessed in the browser application
An omnibox (combined address and search bar of the browser application)
A favorites or recently visited network resources pane
Any other pre-determined area of the browser application interface or a network resource displayed in the browser application In some embodiments of the present technology, each of the content recommendation selection module 115 and the content source selection module 116 can be configured to execute their respective one or more machine learning algorithms. In some embodiments of the present technology, one or more machine learning algorithms can be any suitable or semi-supervised supervised machine learning algorithm, such as but not limited to:
Artificial neural network
Bayesian statistics
Gaussian process regression
Decision trees
And the like It is noted that the respective one or more machine algorithms executed by the content recommendation selection module 115 and the content source selection module 116 do not need to be the same relative to each other.

Even though the content recommendation selection module 115 and the content source selection module 116 have been described as separate entities each executing its respective one or more machine learning algorithms, in alternative embodiments of the present technology, the one or more machine learning algorithms respectively executed by the content recommendation selection module 115 and the content source selection module 116 can be executed by a single entity (such as the processing module 114, for example). Alternatively, the one or more machine learning algorithms respectively executed by the content recommendation selection module 115 and the content source selection module 116 can be distributed amongst more modules than the ones depicted in FIG. 1 and can be executed as part of multiple instances of the recommendation server 112.

Furthermore, each one of the content recommendation selection module 115 and the content source selection module 116 can execute additional functions (i.e. others than the respective one or more machine learning algorithms).

For example, the content source selection module 116 can execute a "crawling function", which can be broadly described as a function for discovering new network resources and/or new content published by the first network resource 124, the second network resource and a number of additional network resources 128. To that end, the content source selection module 116 is configured to execute what is known a "crawler robot" that "visit" various network resources available/accessible via the communication network 110 (including the first network resource 124, the second network resource and a number of additional network resources 128) to discover and catalogue newly available resources (such as one of the first network resource 124, the second network resource and a number of additional network resources 128) or newly published content available from the first network resource 124, the second network resource and a number of additional network resources 128.

As part of the crawling function, the content source selection module 116 is configured to maintain (in the data storage device 118) information representative of the newly discovered network resources and/or newly discovered content available therefrom. In some embodiments, the content source selection module 116 can be configured to maintain an inverted index within the data storage device 118, but the content source selection module 116 can arrange the information representative of the newly discovered network resources and/or newly discovered content available therefrom in a data structure other than an inverted index.

The content source selection module 116 can further collect and maintain additional information about the available network resources and/or content available from those network resources such as one of the first network resource 124, the second network resource and a number of additional network resources 128). Additional information can be generally associated with a visit (i.e. a given user browsing activity of a particular network resource), a hit (i.e. the given user transition into the particular network resource, away from the particular network resource and between various web pages of the particular network resource) or a session (i.e. the particular user browsing session that can include visits to one or more network resources).

Some examples of the additional information collected about the available resources and/or content available from those resources include (but is not limited to):

hits per visit (HPV)—how many pages, within a given network resource, a given user has visited during browsing the given network resource sessions per visit (SPV)—how many sessions contained visits to the particular network resource dated-pages per visit (DPV)—how many pages of a given network resource with a date in the page URL, a given user has visited during a given visit to the given network resource home page per visit (MPV)—how many times during a given visit a given user visited a home page of a given network resource time spent on the network resource (MTIME)—how much time a given user has spent browsing a given network resource last domain per session (LPS)—whether the given network resource was a last network resource in a given web browsing session of a given user first domain per session (FPS)—whether the given network resource was a first network resource in a given web browsing session of a given user hits per session (HPS)—how many pages of any network resources, a given user has visited during a given browsing sessions (i.e. how many transitions were made during the given session)

visits per user (VPU)—an average number of visits to the given network resource hits per user (HPU)—an average number of transitions between various pages of the given network resource (or, alternatively, all network resources)

sessions per user (SPU)—an average number of sessions that included visits the given network resource dated-pages per hit (DPH)—how many pages of a given network resource with a date in the page URL, a given user has visited during a given visit to the given network resource home pages per hit (MPH)—how many times a given user has navigated to the home page of a given network resource during the visit to the given network resource an indication of a source of a transition to the given network resource being one of:

a. direct access visit-source (TT_GR);
  b. search engine visit-source (TT_SE);
  c. social network visit-source (TT_SN);
  d. electronic message visit-source (TT_IM);
  e. URL-condenser visit-source (TT_US); and
  f. ad-platform visit-source (TT_AD).

How the content source selection module 116 collects the additional information is not particularly limited. For example, some sources of the additional information include (but are not limited to): search engine logs, browser application logs, network resource tracking widgets, and the like.

For example, the content source selection module 116 can have access to a search engine log and obtain information of whether a given user has accessed a given network resource from a search engine. As another example, the content source selection module 116 may have access to the logs of the browser application executed on the electronic device 104 and receive an indication (which can be anonymized to protect a given user privacy) in regard to the given user 102: transition to the given network resource, transitions of the given user between various pages of the given network resource, information about the web pages of the given network resource visited (such as URLs, dates in the URLs and the like), time spent on the various web pages of the given network resource, user browsing sessions and the various network resources visited during the browsing session, and the like.

As another example, many of the available network resources install resource tracking widgets (such as, for example, Google™ Analytics, Yandex™ Metrica or the like). Naturally, the content source selection module 116 can obtain the additional information in a number of additional ways from a number of additional sources.

As such, in accordance with the non-limiting embodiments of the present technology, the recommendation server 112 is configured to execute a two-stepped approach to selection recommendations (i.e. recommended items) for inclusion into the recommended content message 152 in response to the request for the content recommendation 150.

The two-stepped approach is particularly useful (but is not limited) for those circumstances when the content recommendation service provided by the recommendation server 112 is offered in a new territory—such as a country, a region of a country, a new city or the like. A particular technical effect arising from the use of embodiments of the present technology, is the ability to "pre qualify" potential sources of content recommendations in an "offline" mode ("offline" referring to processing prior to receiving the request for the content recommendation 150).

Embodiments of the present technology are based on the premise that not all of the network resources (i.e. the first network resource 124, the second network resource 126 and the plurality of additional network resources 128) contain potential content item suitable for processing and recommendation by the recommendation server 112. For example, some of the network resources (i.e. the first network resource 124, the second network resource 126 and the plurality of additional network resources 128) may contain content item that would not be of interest to the subscribers to the recommendation service provided by the recommendation server 112.

Embodiments of the present technology are further based on the premise that content of certain network resources (i.e. the first network resource 124, the second network resource 126 and the plurality of additional network resources 128) is more suitable for processing and recommendation by the recommendation server 112. For example, if a given one of the network resources (i.e. the first network resource 124, the second network resource 126 and the plurality of additional network resources 128) is an aggregator of news, it is more likely to contain content items suitable for processing and recommendation by the recommendation server 112. Such the network resource, is likely to have frequently updated content items (i.e. newly published news, articles, etc), as well as host content items that are of potential interest to a wide audience.

On the other hand, some other network resources (i.e. the first network resource 124, the second network resource 126 and the plurality of additional network resources 128) contain content items that are less susceptible for processing and recommendation by the recommendation server 112. For example, a personal web site of a cat lover from Winnipeg, posting pictures of her three cats, is unlikely to provide potential content items for processing and recommendation by the recommendation server 112. This is due to the fact that the content of such the network resource is rarely updated and is associated with a relatively niche interest.

Generally speaking, the two-stepped approach is aimed at:

At a First Stage:
Select those ones of the plurality of network resources (i.e. the first network resource 124, the second network resource 126 and the plurality of additional network resources 128) that contain potential content items for recommendation—more specifically, the recommendation server 112 determines a source suitability parameter for the network resource, the source suitability parameter being indicative of the network resource being susceptible to publishing the content item that can be processed by the recommendation server 112;

At a Second Stage:
From the so-selected network resources, the recommendation server 112 selects at least one content item, the at least one content item for submitting to the content recommendation selection module 115 for processing and selecting personalized content item recommendations for the user 102, in response to receiving the request for content recommendation 150.

Broadly speaking, in some embodiments of the present technology, the two-stepped approach can be implemented as follows:

Training of the Machine Learning Algorithm

Prior to execution of the two-stepped selection process, the recommendation server 112 (or, more specifically, the processing module 114) executes training of the machine learning algorithm that the content source selection module 116 uses to select content sources. Generally speaking, the machine learning algorithm is trained to determine the source suitability parameter of a given network resources (i.e. the first network resource 124, the second network resource 126 and the plurality of additional network resources 128) based on a training set of network resources and associated labels assigned by assessors. The label can be, for example, "low sources suitability parameter", "medium sources suitability parameter", and "high sources suitability parameter". Alternatively, the label can be, for example, "suitable" and "unsuitable".

During training, the machine learning algorithm of the content source selection module 116 is presented with the training set of network resources and the associated labels in order to process various features associated with the web pages of the network resources in order to develop a given network resource profile and correlate the so-generated network resource profile to the associated labels in order to generate a "machine learning algorithm formula" that enables the machine learning algorithm of the content source selection module 116 to (i) be presented with an unknown network resource (such as a new of the first network resource 124, the second network resource 126 and the plurality of additional network resources 128), (ii) to analyze features of a given web page or the entire network resource (i.e. the first network resource 124, the second network resource 126 and the plurality of additional network resources 128) to generate its respective network resource profile; and (iii) to determine, based on the so-generated network resource profile, a source suitability parameter associated therewith.

In some embodiments of the present technology, the plurality of features used by the machine learning algorithm includes at least an absolute feature (for example, a total number of visits to the network resource) and a relative feature (for example, an average number of visits in a given period of time or a number of hits per user). In some embodiments of the present technology, the machine learning algorithm used the absolute feature and the relative feature as base features and, additionally, generates at least one derivative feature based on at least one of the absolute feature and the relative feature to use for generating the network resource profile.

In various embodiments of the present technology, the derivative features are generated using one or more of: a logarithmic formula, a sigmoid function, and a root function. In some embodiments, the machine learning algorithm normalizes the features of the network resource. In some embodiments, the features are normalized to mean=0, std-dev=1.

In accordance with some embodiments of the present technology, as part of training the machine learning algorithm of the content source selection module 116, the machine learning algorithm is configured to determine out of all possible features of the network resource a sub-set of features that better correlate to the source suitability parameter.

In a specific non-limiting embodiment of the present technology, out of all the possible features associated with the network resource, the machine learning algorithm of the content source selection module 116 can select a sub-set of features that consists of:

at least one of: a proportion of a landing page of the network resource visits within an initial transition to the network resource within a session and a proportion of the landing page visits during transitions within the network resource;

at least one of: a proportion of a web pages associated with an URL containing a date being a first page visited within the initial transition to the network resource and a proportion of the web pages within the network resource visited during the session, the web pages being associated with an URL containing a date;

a proportionate profile of visit sources for the network resource, the visit sources being selected from: search engine/social networks/mail and messenger application/URL condensers/direct visits;

a proportion of session where the network resource was last in the session.

Naturally, in alternative embodiments of the present technology, a different sub-set of entirety of features associated with the network resource can be used by the machine learning algorithm.

Examples of the features include but are not limited to:
hits per visit (HPV)—how many pages, within a given network resource, a given user has visited during browsing the given network resource
sessions per visit (SPV)—how many sessions contained visits to the particular network resource
dated-pages per visit (DPV)—how many pages of a given network resource with a date in the page URL, a given user has visited during a given visit to the given network resource
home page per visit (MPV)—how many times during a given visit a given user visited a home page of a given network resource
time spent on the network resource (MTIME)—how much time a given user has spent browsing a given network resource
last domain per session (LPS)—whether the given network resource was a last network resource in a given web browsing session of a given user
first domain per session (FPS)—whether the given network resource was a first network resource in a given web browsing session of a given user
hits per session (HPS)—how many pages of any network resources, a given user has visited during a given browsing sessions (i.e. how many transitions were made during the given session)
visits per user (VPU)—an average number of visits to the given network resource
hits per user (HPU)—an average number of transitions between various pages of the given network resource (or, alternatively, all network resources)
sessions per user (SPU)—an average number of sessions that included visits the given network resource
dated-pages per hit (DPH)—how many pages of a given network resource with a date in the page URL, a given user has visited during a given transition to the given network resource
home pages per hit (MPH)—how many times a given user has navigated to the home page of a given network resource during the visit to the given network resource
an indication of a source of a transition to the given network resource being one of:
  direct access visit-source (TT_GR);
  search engine visit-source (TT_SE);
  social network visit-source (TT_SN);
  electronic message visit-source (TT_IM);
  URL-condenser visit-source (TT_US); and
  ad-platform visit-source (TT_AD).

It should be noted that when the so-trained machine learning algorithm is trained and is used for determining a source suitability parameter of an unknown network resource, the machine learning algorithm uses at least some (or all) of the features that it has been trained on (or at least features of the same category as it has been trained upon).

In some embodiments of the present technology, the machine learning algorithm is trained to determine the source suitability parameter using a logistical regression analysis. In alternative non-limiting embodiments, the machine learning algorithm is trained to determine the source suitability parameter using one or more of: a logistical regression analysis; naive Bayes algorithm; k-nearest neighbor algorithm; random forest algorithm; and hard voting algorithm.

In some embodiments of the present technology, for a given network resource (i.e. the first network resource 124, the second network resource 126 and the plurality of additional network resources 128), features thereof are grouped based on their geographical location. For example, if the given network resource is the online resource of "New York Times", one feature can be based on network resource visitors from the Unites States, another feature based on network resource visitors from the United Kingdom.

First Stage—Content Recommendation Source Selection

During the first stage, the content source selection module 116 receives an indication of one or more network resources (i.e. the first network resource 124, the second network resource 126 and the plurality of additional network resources 128). In some embodiments, the received indication is an indication of a new network resource that has not previously been crawled. In other embodiments, the received indication is for an updated network resource, i.e. the network resource that has been previously crawled but may have been updated with new content. In some embodiments of the present technology, the content source selection module 116 receives an indication of one or more network resources (i.e. the first network resource 124, the second network resource 126 and the plurality of additional network resources 128) from the data storage device 118.

The content source selection module 116 then executes the trained machine learning algorithm to determine the source suitability parameter associated with the network resource in question (i.e. the first network resource 124, the second network resource 126 and the plurality of additional network resources 128).

In some embodiments of the present technology, the content source selection module 116 generates the network resource profile for an entire network resource (i.e. the first network resource 124, the second network resource 126 and the plurality of additional network resources 128) by analysing features of one or more web pages of the entire network resource (i.e. the first network resource 124, the second network resource 126 and the plurality of additional network resources 128).

In other embodiments of the present technology, the content source selection module 116 generates a respective network resource profile for a sub-set of web pages of the network resource (i.e. the first network resource 124, the second network resource 126 and the plurality of additional network resources 128) by analysing features of one or more web pages of that sub-set of the network resource (i.e. the first network resource 124, the second network resource 126 and the plurality of additional network resources 128).

In yet further embodiments, the content source selection module 116 can generate a respective network resource profile for each web page of the network resource (i.e. the first network resource 124, the second network resource 126 and the plurality of additional network resources 128) by analysing features of each individual web page of the network resource (i.e. the first network resource 124, the second network resource 126 and the plurality of additional network resources 128).

Then, based on the so-generated profile (whether for an individual web page, a sub-set of web pages within the given network resource, or the entire given network resource), the content source selection module 116 determines the content source suitability parameter. The content source selection module 116 generates the content source suitability parameter based on the machine learning algorithm formula generated during the training phase.

The content source selection module 116 then determines if the given network resource (or a sub-set of web pages or individual web pages thereof, as the case may be) are potential sources of content items for recommendation. In some embodiments of the present technology, the content source selection module 116 compares the so-determined source suitability parameter to a pre-determined threshold—in response to the source suitability parameter being above the pre-determine threshold, the content source selection module 116 determines that the given network resource (or a sub-set of web pages or individual web pages thereof, as the case may be) is a potential source of the recommendation items. It is noted that the pre-determined threshold can be determined by the machine learning algorithm as part of the training phase.

Second Stage—Content Recommendations Selection from the Selected Content Sources Next, the content source selection module 116 selects, out of each of the network resources having been determined to be potential sources of content items, one or more content items for submitting to the recommendation engine (i.e. content recommendation selection module 115).

In some embodiments of the present technology, the selection of the content items from the so-selected content sources is executed "on-line", i.e. in response to the receipt of the request for the content recommendation 150. In other embodiments, the selection of the content items from the so-selected content sources can be executed "off-line", i.e. before the receipt of the request for the content recommendation 150 (for example, such selection can be executed on a regular basis, such as every day, every 7 days, every month or the like, based on how "perishable" content items are).

The selection of the content items from the so-selected content sources can be executed using one or more heuristics. For example, the content source selection module 116 selects a pre-defined number of content items (such as 2 content items, 5 content items, 10 content items, and the like) being associated with one or more: (i) most recent publication date, (ii) most visits during the past X number of days, (iii) being associated with a particular section of the given network resource (such as "most recent", "hot", etc).

Processing by the Recommendation System

Once the content source selection module 116 selects the content items candidates from one or more of the identified content sources, the so-selected candidates are submitted to the content recommendation selection module 115. The content recommendation selection module 115 executes its own machine learning algorithm that is trained and configured to select from the content items candidates submitted thereto, a sub-set of content items for the given user 102 in response to receipt of the request for the content recommendation 150.

How the content recommendation selection module 115 is implemented is not particularly limited. An example of the machine learning algorithm that can be used by the content recommendation selection module 115 is disclosed in a co-owned Russian Patent Application entitled: "METHOD AND APPARATUS FOR GENERATING A RECOMMENDED CONTENT LIST" and bearing an application number 2015136684 filed on Aug. 22, 2015; content of which is incorporated herein by reference in its entirety.

Once the content recommendation selection module 115 generates the sub-set of content items for the given user 102, the content recommendation selection module 115 generates a recommended content message 152 and transmits same to the electronic device 104. When the electronic device 104 receives the recommended content message 152, the recommendation application 106 processes content thereof and displays the recommended content items on the recommendation interface 108. How the recommendation interface 108 is implemented is not particularly limited—the recommendation interface 108 depicted in FIG. 2 can be used. As another example, the recommendation interface 108 can be implemented as disclosed in the co-owned Russian Patent Application entitled: "METHOD OF AND SYSTEM FOR INTERACTING WITH A CONTENT ELEMENT OF A CONTENT STREAM" and bearing an application number 2015141291 filed on Sep. 29, 2015; content of which is incorporated herein by reference in its entirety.

Given the architecture and examples provided herein above, it is possible to execute a method of selecting a network resource as a source of a content item, the content item to be analyzed by a recommendation system (i.e. the content recommendation selection module 115) as part of a plurality of content items to generate a set of recommended content items as a recommendation for the given user 102 of the system 100.

Figure 4:
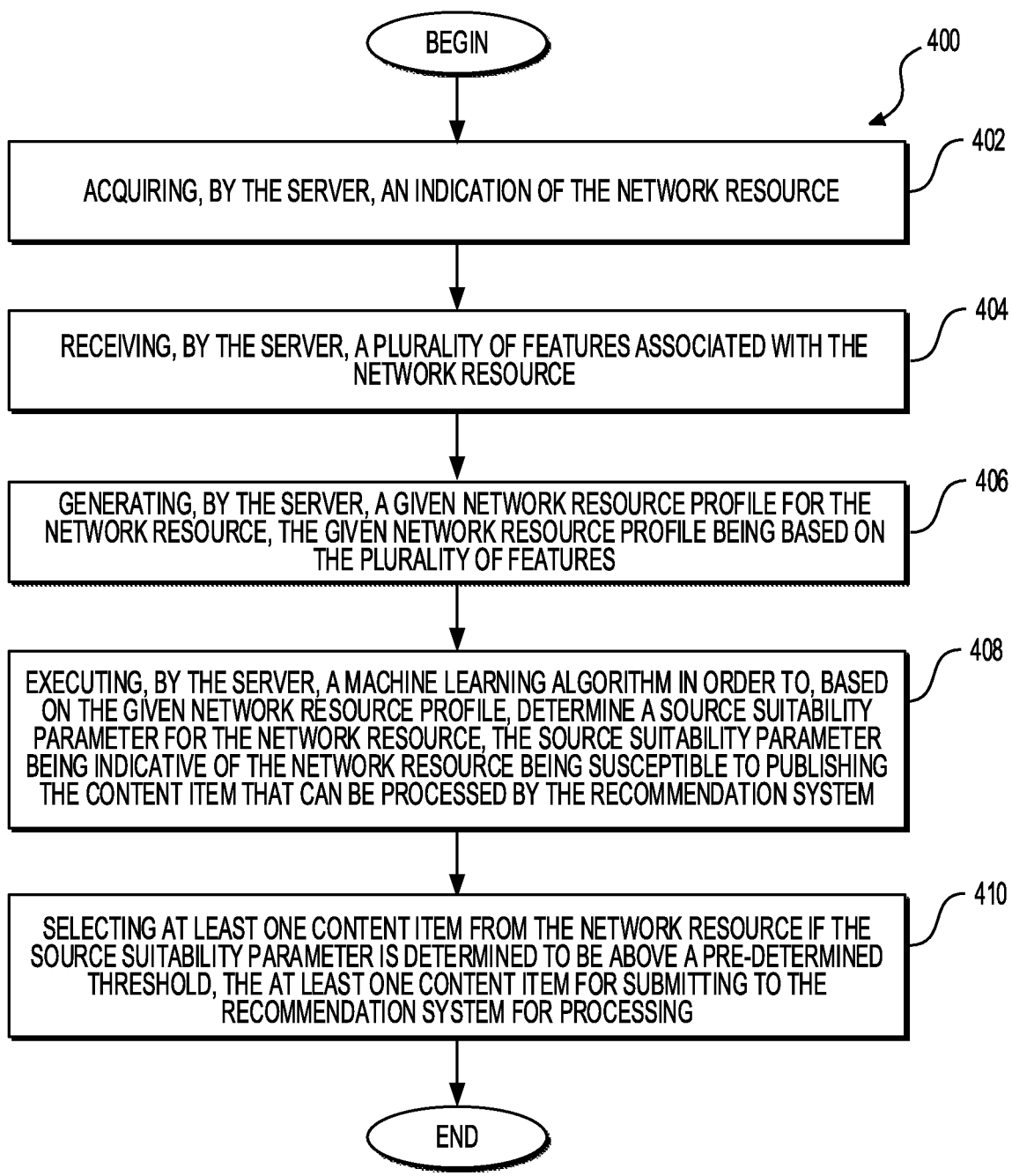
FIG. 4 depicts a block diagram of a method, the method executable in accordance with non-limiting embodiments of the present technology, the method executable within the system of FIG. 1.

FIG. 4 depicts a block diagram of a method 400, the method 400 executable in accordance with non-limiting embodiments of the present technology. The method 400 can be executed on the recommendation server 112 and, more specifically, using the content source selection module 116. For the purposes of the description to be presented herein below, it is assumed that the machine learning algorithm to be executed by the content source selection module 116 has been trained to determine a source suitability parameter based on training web site profiles generated with an associated plurality of training features at least some of which are of a same category as the plurality of features to be used during execution of the method 200.

Step 402—acquiring, by the server, an indication of the network resource

The method 400 begins at step 402, where the content source selection module 116 receives an indication of the network resource.

As has been previously alluded to, the content source selection module 116 can execute a "crawling function", which can be broadly described as a function for discovering new network resources and/or new content published by the first network resource 124, the second network resource and a number of additional network resources 128. To that end, the content source selection module 116 is configured to execute what is known a "crawler robot" to visit various network resources available/accessible via the communication network 110 (including the first network resource 124, the second network resource and a number of additional network resources 128) to discover and catalogue newly available resources (such as one of the first network resource 124, the second network resource and a number of additional network resources 128) or newly published content available from the first network resource 124, the second network resource and a number of additional network resources 128.

As part of the crawling function, the content source selection module 116 is configured to maintain (in the data storage device 118) information representative of the newly discovered network resources and/or newly discovered content available therefrom. In some embodiments, the content source selection module 116 can be configured to maintain an inverted index within the data storage device 118, but the content source selection module 116 can arrange the information representative of the newly discovered network resources and/or newly discovered content available therefrom in a data structure other than an inverted index.

As such, in some embodiments of the present technology, the content source selection module 116 can receive an indication of the network resource to be processed from the data storage device 118.

Step 404—receiving, by the server, a plurality of features associated with the network resource At step 404, the content source selection module 116 receives a plurality of features associated with the network resource. For example, the content source selection module 116 can retrieve features associated with the network resource from the data storage device 118.

As will be recalled, the machine learning algorithm executed by the content source selection module 116 has been trained on certain features of the training set of network resources and, as such, the machine learning algorithm executed by the content source selection module 116 retrieves those features associated with the network resource that it has been trained to process.

In some embodiments of the method 400, the machine learning algorithm having been trained, prior to said acquiring, to determine the source suitability parameter based on training web site profiles generated with an associated plurality of training features at least some of which are of a same category as the plurality of features.

In some embodiments of the method 400, the plurality of features includes at least an absolute feature and a relative feature.

In some embodiments of the method 400 the absolute feature and the relative feature are base features and the method 400 further comprises: generating at least one derivative feature based on at least one of the absolute feature and the relative feature; and wherein the given web site profile is further based on the at least one derivative feature.

In some embodiments of the method 400, the plurality of features includes an indication of a proportion of visit sources to the network resource.

In some embodiments of the method 400, the plurality of features includes at least one relative feature selected from:
 hits per visit (HPV);
 sessions per visit (SPV);
 dated-pages per visit (DPV);
 home page per visit (MPV);
 time spent on the network resource (MTIME);
 last domain per session (LPS);
 first domain per session (FPS);
 hits per session (HPS);
 visits per user (VPU);
 hits per user (HPU);
 sessions per user (SPU);
 dated-pages per hit (DPH);
 home pages per hit (MPH); and
 an indication of a visit source being one of:
 direct access visit-source (TT_GR);
 search engine visit-source (TT_SE);
 social network visit-source (TT_SN);
 electronic message visit-source (TT_IM);
 URL-condenser visit-source (TT_US); and
 ad-platform visit-source (TT_AD).

In some embodiments of the method 400, the plurality of features includes at least one of: a number of users visiting the network resource per time interval, number of visits per time interval, number of transitions within various web pages within the network resource per time interval, and a number of unique sessions with the network resource per time interval.

In some embodiments of the method 400, the plurality of features is a subset of all possible features, the method further comprising executing a feature selection to define the subset.

In some embodiments of the method 400, the subset of all possible features consists of:
 at least one of: a proportion of a landing page of the network resource visits within an initial transition to the network resource within a session and a proportion of the landing page visits during transitions within the network resource;
 at least one of: a proportion of a web page associated with an URL containing a date being a first page visited within the initial transition to the network resource and a proportion of the web pages within the network resource visited during the session, the web pages being associated with an URL containing a date;
 a proportionate profile of visit sources for the network resource, the visit sources being selected from: search engine/social networks/mail and messenger application/URL condensers/direct visits;
 a proportion of session where the network resource was last in the session.

Step 406—generating, by the server, a given network resource profile for the network resource, the given network resource profile being based on the plurality of features At step 406, the content source selection module 116 generates a given network resource profile for the network resource, the given network resource profile being based on the plurality of features.

In some embodiments of the present technology, the content source selection module 116 generates a vector representative of the given network resource profile based on some or all of:
 hits per visit (HPV);
 sessions per visit (SPV);
 dated-pages per visit (DPV);
 home page per visit (MPV);
 time spent on the network resource (MTIME);
 last domain per session (LPS);
 first domain per session (FPS);
 hits per session (HPS);
 visits per user (VPU);
 hits per user (HPU);
 sessions per user (SPU);
 dated-pages per hit (DPH);
 home pages per hit (MPH); and
 an indication of a visit source being one of:
 direct access visit-source (TT_GR);
 search engine visit-source (TT_SE);
 social network visit-source (TT_SN);
 electronic message visit-source (TT_IM);
 URL-condenser visit-source (TT_US); and
 ad-platform visit-source (TT_AD).

In some embodiments of the present technology, the content source selection module 116 executes a feature selection routine and, as such, the vector representative of the given network resource profile can be based on a pre-selected set of network resource features.

Step 408—executing, by the server, a machine learning algorithm in order to, based on the given network resource profile, determine a source suitability parameter for the network resource, the source suitability parameter being indicative of the network resource being susceptible to publishing the content item that can be processed by the recommendation system At step 408, the content source selection module 116 executes a machine learning algorithm in order to, based on the given network resource profile, determine a source suitability parameter for the network resource, the source suitability parameter being indicative of the network resource being susceptible to publishing the content item that can be processed by the recommendation system.

In some embodiments of the method 400, the source suitability parameter is one of a suitable and non-suitable. The source suitability parameter can be determined using at least one of:
- a logistical regression analysis;
- naive Bayes algorithm;
- k-nearest neighbor algorithm;
- random forest algorithm; and
- hard voting algorithm.

Step 410—selecting at least one content item from the network resource if the source suitability parameter is determined to be above a pre-determined threshold, the at least one content item for submitting to the recommendation system for processing At step 410, the content source selection module 116 selects at least one content item from the network resource if the source suitability parameter is determined to be above a pre-determined threshold, the at least one content item for submitting to the recommendation system for processing (i.e. the content recommendation selection module 115).

In some embodiments of the present technology, step 410 is implemented in response to a request from the given user 102 for a recommendation (i.e. in response to receiving the request for the content recommendation 150).

The method 400 can then terminate or return to step 402 and await for another one of the request for content recommendation 150.

Figure 3:
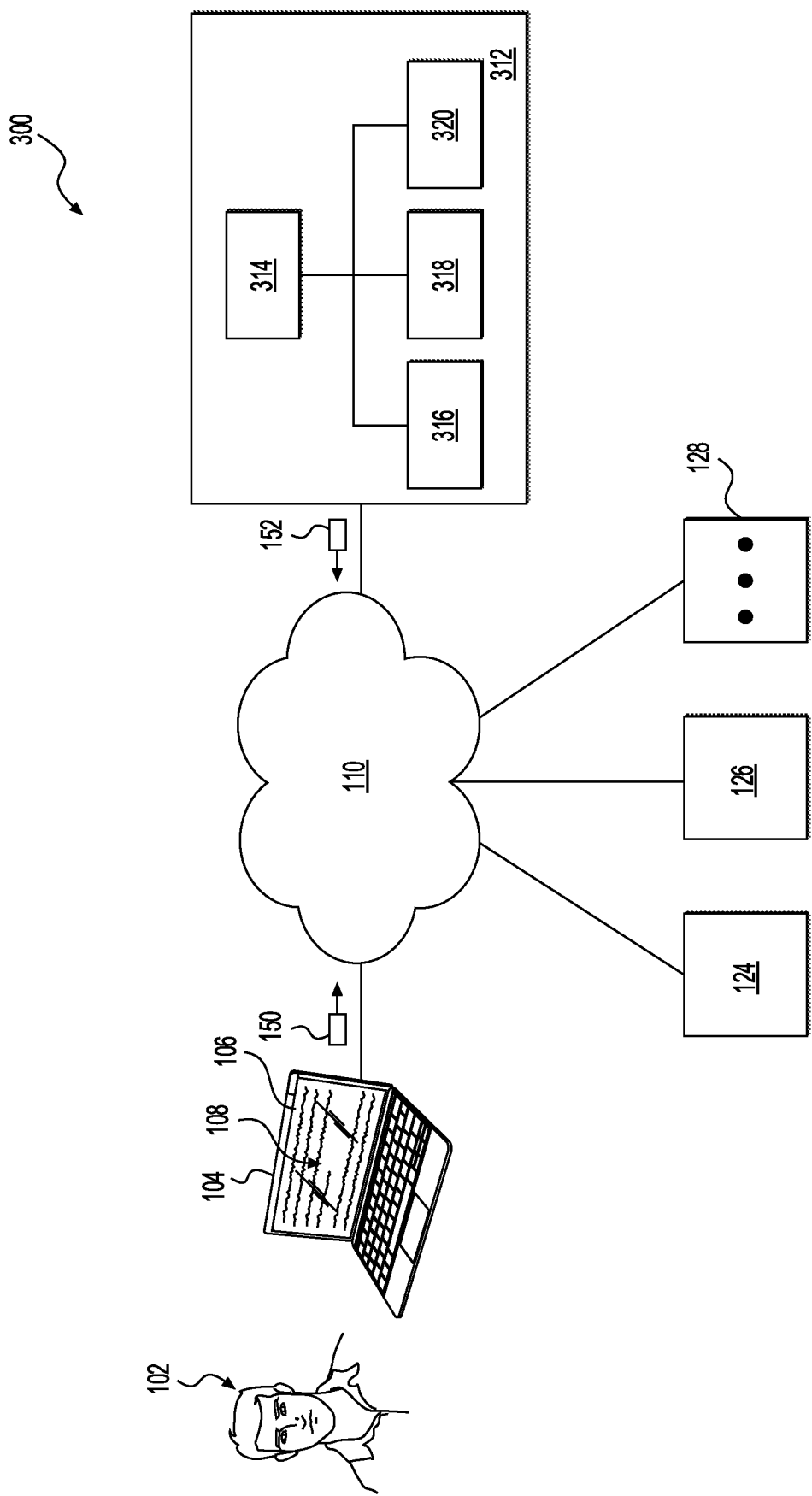
FIG. 3 depicts another embodiment of a system, the system being implemented in accordance with another non-limiting embodiment of the present technology.

With reference to FIG. 3, there is depicted another embodiment of a system 300, the system 300 being implemented in accordance with another non-limiting embodiment of the present technology. The system 300 includes certain components that are implemented substantially similar to those of the system 100. These components are denoted with the same reference numerals as components of the system 100. To that end, the system 300 comprises: the user 102, the electronic device 104 (with the recommendation application 106 executed thereon, the recommendation application 106 having the recommendation interface 108), and the communication network 110. Also coupled to the communication network 110 are the first network resource 124, the second network resource 126 and the plurality of additional network resources 128 that are all network resources accessible by the electronic device 104 (as well as other electronic devices potentially present in the system 300) via the communication network 110.

Respective content of the first network resource 124, the second network resource 126 and the plurality of additional network resources 128 is not particularly limited. As such a given one of the first network resource 124, the second network resource 126 and the plurality of additional network resources 128 can contain (or in other words, host) digital content such as: audio content for streaming, video content for streaming, news, blogs, information about various government institutions, information about points of interest, thematically clustered content (such as content relevant to those interested in kick-boxing), and the like.

In accordance with the non-limiting embodiment depicted in FIG. 3, the system 300 further comprises a recommendation server 312. The recommendation server 312 can be implemented as a conventional computer server. In an example of an embodiment of the present technology, the recommendation server 312 can be implemented as a Dell™ PowerEdge™ Server running the Microsoft™ Windows Server™ operating system. Needless to say, the recommendation server 312 can be implemented in any other suitable hardware, software, and/or firmware, or a combination thereof. In the depicted non-limiting embodiments of the present technology, the recommendation server 312 is a single server. In alternative non-limiting embodiments of the present technology, the functionality of the recommendation server 312 may be distributed and may be implemented via multiple servers.

The recommendation server 312 comprises a processing module 314. The processing module 314 is coupled to a content source determination module 316. The content source determination module 316 is configured to determine out of a plurality of potential content sources (i.e. the first network resource 124, the second network resource 126 and the plurality of additional network resources 128) a sub-set of content sources.

In some embodiments of the present technology, the content source determination module 316 is configured to execute a first machine learning algorithm in order to determine the sub-set of recommended content sources from the plurality of possible content sources (i.e. the first network resource 124, the second network resource 126 and the plurality of additional network resources 128).

In some embodiments of the present technology, in order to determine the sub-set of recommended content sources, the content source determination module 316 is configured to:
- acquire an indication of user-past-interactions with at least one of: (i) the system 100 and (ii) at least some of the plurality of network resources (such as the first network resource 124, the second network resource 126 and the plurality of additional network resources 128);
- based on the user-past-interactions, determine a first sub-set of user-specific content sources (i.e. some of the first network resource 124, the second network resource 126 and the plurality of additional network resources 128);
- based on (i) a machine learning algorithm trained formula of other user interactions with at least some others of the plurality of network resources (i.e. the first network resource 124, the second network resource 126 and the plurality of additional network resources 128) and at least one of: (ii) the first sub-set of user-specific content sources; and (iii) a user-profile-vector generated based on the user-past-interactions, to generate a second sub-set of user-non-specific content sources;
- process the first sub-set of user specific content sources and the second sub-set of user-non-specific content sources in order to generate the sub-set of recommended content sources;

More specifically, the function of the content source determination module 316 can be implemented as follows, in at least some of the non-limiting embodiments of the present technology.

Generating a User-Profile-Vector

The content source determination module 316 can acquire an indication of user-past-interactions with at least one of: (i) the system 300 and (ii) at least some of the plurality of network resources (such as the first network resource 124, the second network resource 126 and the plurality of additional network resources 128).

In some embodiments of the present technology, the content source determination module 316 receives the indication of the user-past-interaction from the browser application executed on the electronic device 104. In other embodiments, the content source determination module 316 receives the indication of the user-past-interaction from the search engine logs. In yet other embodiments, the content source determination module 316 receives the indication of the user-past-interaction from the tracking widgets installed at the various network resources (such as the first network resource 124, the second network resource 126 and the plurality of additional network resources 128).

Determining a User-Specific Sub-Set of Content Sources

Based on the user-past-interactions, the content source determination module 316 can determine a first sub-set of user-specific content sources (i.e. some of the first network resource 124, the second network resource 126 and the plurality of additional network resources 128). More specifically, the content source determination module 316 determines one or more of the potentially content sources (i.e. some of the first network resource 124, the second network resource 126 and the plurality of additional network resources 128) that the user 102 has interacted with in the past—for example, by means of browsing to or through one or more of the network resources, receiving and/or actuating a content recommendations from one or more of the network resources, etc. In other words, the first sub-set of user-specific content sources can be thought of "user-specific" or "expressly liked content sources" in the sense that the user 102 has specifically interacted with these network resources and can be deemed to like the content thereof due to the interaction therewith.

Enriching the User-Specific Sub-Set of Content Sources to Generate a User-Non-Specific Sub-Set of Content Sources Next, the content source determination module 316 enriches the user-specific sub-set of content sources with content sources that the user 102 may not have previously seen. More specifically, based on (i) a machine learning algorithm trained formula of other user interactions with at least some others of the plurality of network resources (i.e. the first network resource 124, the second network resource 126 and the plurality of additional network resources 128) and at least one of: (ii) the first sub-set of user-specific content sources; and (iii) a user-profile-vector generated based on the user-past-interactions, to generate a second sub-set of user-non-specific content sources.

In some embodiments of the present technology, the machine learning algorithm used can be a Singular Value Decomposition (SVD) algorithm. Within these implementations of the present technology, the machine learning algorithm determines the user-non-specific sub-set of content sources based on a user-profile-vector generated based on the user-past-interactions. More specifically, the machine learning algorithm, implemented as the SVD algorithm, generates a matrix of (i) network resources events and (ii) users (based on information about past interactions of a plurality of users with a plurality of network resources, i.e. the first network resource 124, the second network resource 126 and the plurality of additional network resources 128).

The machine learning algorithm then applies the SVD algorithm to decompose the matrix into vectors of network resources and vectors of users. Then, the SVD algorithm discards the vectors of users and saves the vectors of network resources (for example stores them in a data storage device, which is not depicted in FIG. 3).

When the content source determination module 316 receives the user-profile-vector, the SVD algorithm multiplies the so-received user-profile-vector and the saved vectors of network resources to recreate the matrix of network resources with their associated ranks specific for the user 102 associated with the user-profile-vector. Based on the ranked network resources, the content source determination module 316 selects a pre-determined number of top-ranked network resources to generate the user-non-specific sub-set of content sources.

In some embodiments of the present technology, the machine learning algorithm used can be Pointwise Mutual Information (PMI) algorithm. Within these implementations of the present technology, the machine learning algorithm determines the user-non-specific sub-set of content sources based on the first sub-set of user-specific content sources. More specifically, the machine learning algorithm determines for each of the network resources within the first sub-set of user-specific content sources and each of the crawled potential content sources: (i) how often the pair has occurred together (were browsed together, appeared together as part of search results, etc) during a particular interaction; and (ii) how often a respective one of the network resources was interacted with. The machine learning algorithm then calculates a proportion of the number of occurrences together (as per (i)) to a multiplication of the individual values of occurrences of the respective network resources (as per (ii)).

For each of the network resources in the first sub-set of user-specific content sources, the machine learning algorithm selects a pre-determined number of top-ranked resources determined by the PMI algorithm to generate the user-non-specific sub-set of content sources.

Processing User-Specific and User-Non-Specific Subsets of Content Sources to Generate the Sub-Set of Recommended Content Sources The content source determination module 316 then processes the first sub-set of user specific content sources and the second sub-set of user-non-specific content sources in order to generate the sub-set of recommended content sources.

In some embodiments of the present technology, the content source determination module 316 selects a pre-determined number of the content sources from the user-non-specific sub-set of content sources. In other embodiments of the present technology, the content source determination module 316 selects a pre-determined number of the content sources from the user-non-specific sub-set of content sources and a pre-determined number of content sources from the first sub-set of user-specific content sources. The content source determination module 316 can be configured to determine the respective numbers of the pre-determined content sources, considering that the larger the number selected from user-non-specific sub-set of content sources, the more content items recommendations from "new" sources the user 102 is likely to get. Conversely, the larger the number selected from first sub-set of user-specific content sources, the more content items recommendations from "known" sources (and therefore, more likely to be acceptable) the user 102 is likely to get The recommendation server 312 further comprises a potentially-recommendable content items selection module 318 for analyzing the sub-set of recommended content sources to select a plurality of potentially-recommendable content items.

The selection of the content items from the so-selected content sources can be executed using one or more heuristics. For example, the content source selection module 116 selects a pre-defined number of content items (such as 2 content items, 5 content items, 10 content items, and the like) being associated with one or more: (i) most recent publication date, (ii) most visits during the past X number of days, (iii) being associated with a particular section of the given network resource (such as "most recent", "hot", etc).

The recommendation server 312 further comprises a content recommendation selection module 320 for executing a second machine learning algorithm module in order to select, from the plurality of potentially-recommendable content items, at least one recommended content item; the selection being made on the basis of the user-profile-vector.

How the content recommendation selection module 320 is not particularly limited. An example of the machine learning algorithm that can be used by the content recommendation selection module 320 is disclosed in a co-owned Russian Patent Application entitled: "METHOD AND APPARATUS FOR GENERATING A RECOMMENDED CONTENT LIST" and bearing an application number 2015136684 filed on Aug. 22, 2015; content of which is incorporated herein by reference in its entirety.

Once the content recommendation selection module 320 generates the sub-set of content items for the given user 102, the content recommendation selection module 320 generates a recommended content message 152 and transmits same to the electronic device 104. When the electronic device 104 receives the recommended content message 152, the recommendation application 106 processes content thereof and displays the recommended content items on the recommendation interface 108. How the recommendation interface 108 is implemented is not particularly limited—the recommendation interface 108 depicted in FIG. 2 can be used. As another example, the recommendation interface 108 can be implemented as disclosed in the co-owned Russian Patent Application entitled: "METHOD OF AND SYSTEM FOR INTERACTING WITH A CONTENT ELEMENT OF A CONTENT STREAM" and bearing an application number 2015141291 filed on Sep. 29, 2015; content of which is incorporated herein by reference in its entirety.

Figure 5:
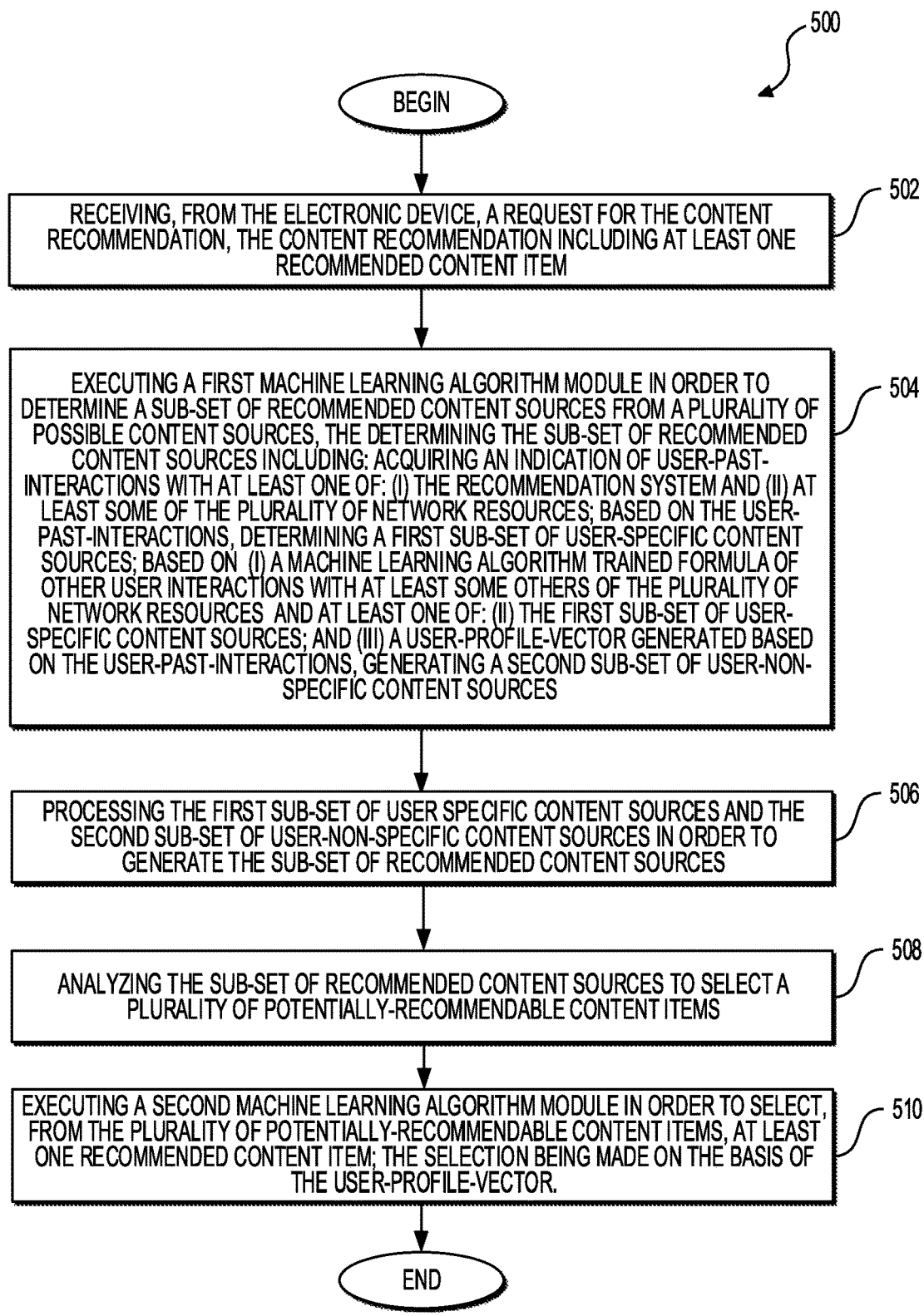
FIG. 5 depicts a block diagram of a method, the method executable in accordance with another non-limiting embodiment of the present technology, the method executable within the system of FIG. 3.

Given the architecture and examples provided herein above, it is possible to execute a method of generating a content recommendation for the user 170 of the electronic device 104. FIG. 5 depicts a block diagram of a method 500, the method 500 executable in accordance with non-limiting embodiments of the present technology. The method 500 can be executed on the recommendation server 312 and, more specifically, using the content source determination module 316 and the potentially-recommendable content items selection module 318. For the purposes of the description to be presented herein below, it is assumed that the machine learning algorithm to be executed by the content source selection module 116 has been trained to determine a source suitability parameter based on training web site profiles generated with an associated plurality of training features at least some of which are of a same category as the plurality of features to be used during execution of the method 200.

Step 502—receiving, from the electronic device, a request for the content recommendation, the content recommendation including at least one recommended content item The method 500 starts at step 502, where the content source selection module 116 receives, from the electronic device 104, the request for the content recommendation 150, the content recommendation including at least one recommended content item.

Step 504—executing a first machine learning algorithm module in order to determine a sub-set of recommended content sources from a plurality of possible content sources, the determining the sub-set of recommended content sources including: acquiring an indication of user-past-interactions with at least one of: (i) the recommendation system and (ii) at least some of the plurality of network resources; based on the user-past-interactions, determining a first sub-set of user-specific content sources; based on (i) a machine learning algorithm trained formula of other user interactions with at least some others of the plurality of network resources and at least one of: (ii) the first sub-set of user-specific content sources; and (iii) a user-profile-vector generated based on the user-past-interactions generating a second sub-set of user-non-specific content sources At step 504, the content source selection module 116 executes a first machine learning algorithm module in order to determine a sub-set of recommended content sources from a plurality of possible content sources, the determining the sub-set of recommended content sources including:
  acquiring an indication of user-past-interactions with at least one of: (i) the recommendation system and (ii) at least some of the plurality of network resources;
  based on the user-past-interactions, determining a first sub-set of user-specific content sources;
  based on
    (i) a machine learning algorithm trained formula of other user interactions with at least some others of the plurality of network resources; and at least one of:
    (ii) the first sub-set of user-specific content sources; and
    (iii) a user-profile-vector generated based on the user-past-interactions
  generating a second sub-set of user-non-specific content sources In some embodiment of the method 500, the determining the first sub-set of user-specific content sources comprises applying an SVD algorithm. Within these embodiments, the determining the first sub-set of user-specific content sources is based on: (i) the machine learning algorithm trained formula of other user interactions with at least some others of the plurality of network resources; and (ii) the user-profile-vector generated based on the user-past-interactions.

Within these embodiments of the method 500, the method 500 further comprises, prior to the receiving the request for the content recommendation, generating by the SVD algorithm a matrix of network resources events and users.

In other embodiments of the method 500, the determining the first sub-set of user-specific content sources comprises applying a PMI algorithm. In these embodiments of the method 500, the determining the first sub-set of user-specific content sources is based on: (i) the machine learning algorithm trained formula of other user interactions with at least some others of the plurality of network resources; and (ii) the first sub-set of user-specific content sources.

Step 506—processing the first sub-set of user specific content sources and the second sub-set of user-non-specific content sources in order to generate the sub-set of recommended content sources At step 506, the content source selection module 116 processes the first sub-set of user specific content sources and the second sub-set of user-non-specific content sources in order to generate the sub-set of recommended content sources.

Step 508—analyzing the sub-set of recommended content sources to select a plurality of potentially-recommendable content items At step 508, the content source selection module 116 analyzes the sub-set of recommended content sources to select a plurality of potentially-recommendable content items Step 510—executing a second machine learning algorithm module in order to select, from the plurality of potentially-recommendable content items, at least one recommended content item; the selection being made on the basis of the user-profile-vector At step 510, the comprises a potentially-recommendable content items selection module 318 executes a second machine learning algorithm module in order to select, from the plurality of potentially-recommendable content items, at least one recommended content item; the selection being made on the basis of the user-profile-vector.

In some embodiments of the method 500, the selection from the sub-set of recommended content sources the plurality of potentially-recommendable content items comprises determining a pre-defined number of most recent content items.

In other embodiments of the method 500, the selection from the sub-set of recommended content sources the plurality of potentially-recommendable content items comprises determining a pre-defined number of most popular content items.

In other embodiments of the method 500, the selection from the sub-set of recommended content sources is specific to a geographic region where the request for content recommendation was executed from.

In other embodiments of the method 500, the method 500 further comprises filtering the selected potentially-recommendable content items. In other embodiments of the method 500, the filtering is based on a language setting of the electronic device and a language setting of the content item.

Some embodiments of the present technology can lead to a technical effect of arising from the use of embodiments of the present technology, is the ability to "pre qualify" potential sources of content recommendations in an "offline" mode ("offline" referring to processing prior to receiving the request for the content recommendation 150). In some embodiments of the present technology, a technical effect arises form an ability to pre qualify network resources as sources of recommended content items when entering a new territory.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of selecting a network resource as a source of a content item, the content item to be analyzed by a recommendation system as part of a plurality of content items to generate a set of recommended content items as a content recommendation for a given user of the recommendation system, the recommendation system being executed at a server coupled to a communication network, the method comprising:
   prior to acquiring a content recommendation request from the given user:
      acquiring, by the server, an indication of the network resource;
      receiving, by the server, a plurality of features associated with the network resource;
      generating, by the server, a given network resource profile for the network resource, the given network resource profile being based on the plurality of features;
      executing, by the server, a machine learning algorithm in order to, based on the given network resource profile, determine a source suitability parameter for the network resource, the source suitability parameter being indicative of the network resource being susceptible to publishing the content item that can be processed by the recommendation system,
   acquiring the content recommendation request from the given user;
      selecting at least one content item from the network resource if the source suitability parameter is determined to be above a pre-determined threshold, the at least one content item for submitting to the recommendation system for processing; and
      generating the content recommendation for the given user, the content recommendation including the least one content item from the network resource.

2. The method of claim 1, wherein:
the machine learning algorithm having been trained, prior to said acquiring, to determine the source suitability parameter based on training web site profiles generated with an associated plurality of training features at least some of which are of a same category as the plurality of features.

3. The method of claim 1, wherein the plurality of features includes at least an absolute feature and a relative feature.

4. The method of claim 3, wherein the absolute feature and the relative feature are base features and wherein the method further comprises:
   generating at least one derivative feature based on at least one of the absolute feature and the relative feature; and wherein
   the given web site profile is further based on the at least one derivative feature.

5. The method of claim 1, wherein the plurality of features includes an indication of a proportion of visit sources to the network resource.

6. The method of claim 1, wherein the plurality of features includes at least one relative feature selected from:
   hits per visit (HPV);
   sessions per visit (SPV);
   dated-pages per visit (DPV);
   home page per visit (MPV);
   time spent on the network resource (MTIME);
   last domain per session (LPS);
   first domain per session (FPS);
   hits per session (HPS);
   visits per user (VPU);
   hits per user (HPU);
   sessions per user (SPU);
   dated-pages per hit (DPH);
   home pages per hit (MPH); and
   an indication of a visit source being one of:
      direct access visit-source (TT_GR);
      search engine visit-source (TT_SE);
      social network visit-source (TT_SN);
      electronic message visit-source (TT_IM);
      URL-condenser visit-source (TT_US); and
      ad-platform visit-source (TT_AD).

7. The method of claim 1, wherein the plurality of features includes at least one of: a number of users visiting the network resource per time interval, number of visits per time interval, number of transitions within various web pages within the network resource per time interval, and a number of unique sessions with the network resource per time interval.

8. The method of claim 1, wherein the plurality of features is a subset of all possible features, the method further comprising executing a feature selection to define the subset.

9. The method of claim 8, wherein the subset of all possible features consists of:
at least one of: a proportion of a landing page of the network resource visits within an initial transition to the network resource within a session and a proportion of the landing page visits during transitions within the network resource;
at least one of: a proportion of a web page associated with an URL containing a date being a first page visited within the initial transition to the network resource and a proportion of the web pages within the network resource visited during the session, the web pages being associated with an URL containing a date;
a proportionate profile of visit sources for the network resource, the visit sources being selected from: search engine/social networks/mail and messenger application/URL condensers/direct visits;
a proportion of session where the network resource was last in the session.

10. The method of claim 1, wherein the source suitability parameter is one of a suitable and non-suitable.

11. The method of claim 10, wherein the source suitability parameter is determined using at least one of:
a logistical regression analysis;
naive Bayes algorithm;
k-nearest neighbor algorithm;
random forest algorithm; and
hard voting algorithm.

12. A server comprising:
a data storage medium;
a network interface configured for communication over a communication network;
a processor operationally coupled to the data storage medium and the network interface, the processor being configured to:
prior to acquiring a content recommendation request from the given user:
acquire an indication of the network resource, the network resource to be processed to determine its suitability as a source of a content item, the content item to be analyzed by a recommendation system as part of a plurality of content items to generate a set of recommended content items as a recommendation for a given user of the recommendation system;
receive a plurality of features associated with the network resource;
generate a given network resource profile for the network resource, the given network resource profile being based on the plurality of features;
execute a machine learning algorithm in order to, based on the given network resource profile, determine a source suitability parameter for the network resource, the source suitability parameter being indicative of the network resource being susceptible to publishing a content item that can be processed by the recommendation system;
acquire the content recommendation request from the given user;
select at least one content item from the network resource if the source suitability parameter is determined to be above a pre-determined threshold, the at least one content item for submitting to the recommendation system for processing; and
generate the content recommendation for the given user, the content recommendation including the at least one content item from the network resource.

13. The server of claim 12, wherein:
the machine learning algorithm has been trained, prior to said acquiring, to determine the source suitability parameter based on training web site profiles generated with an associated plurality of training features at least some of which are of a same category as the plurality of features.

14. The server of claim 12, wherein the plurality of features includes at least an absolute feature and a relative feature.

15. The server of claim 14, wherein the absolute feature and the relative feature are base features and wherein the processor is further configured to:
generate at least one derivative feature based on at least one of the absolute feature and the relative feature; and wherein
the given web site profile is further based on the at least one derivative feature.

16. The server of claim 12, wherein the plurality of features includes an indication of a proportion of visit sources to the network resource.

17. The server of claim 12, wherein the plurality of features includes at least one relative feature selected from:
hits per visit (HPV);
sessions per visit (SPV);
dated-pages per visit (DPV);
home page per visit (MPV);
time spent on the network resource (MTIME);
last domain per session (LPS);
first domain per session (FPS);
hits per session (HPS);
visits per user (VPU);
hits per user (HPU);
sessions per user (SPU);
dated-pages per hit (DPH);
home pages per hit (MPH); and
an indication of a visit source being one of:
direct access visit-source (TT_GR);
search engine visit-source (TT_SE);
social network visit-source (TT_SN);
electronic message visit-source (TT_IM);
URL-condenser visit-source (TT_US); and
ad-platform visit-source (TT_AD).

18. The server of claim 12, wherein the plurality of features includes at least one of: a number of users visiting the network resource per time interval, number of visits per time interval, number of transitions within various web pages within the network resource per time interval, and a number of unique sessions with the network resource per time interval.

19. The server of claim 12, wherein the plurality of features is a subset of all possible features, the method further comprising executing a feature selection to define the subset; and wherein the subset of all possible features consists of:
at least one of: a proportion of a landing page of the network resource visits within an initial transition to the network resource within a session and a proportion of the landing page visits during transitions within the network resource;

at least one of: a proportion of a web page associated with an URL containing a date being a first page visited within the initial transition to the network resource and a proportion of the web pages within the network resource visited during the session, the web pages being associated with an URL containing a date;

a proportionate profile of visit sources for the network resource, the visit sources being selected from: search engine/social networks/mail and messenger application/URL condensers/direct visits;

a proportion of session where the network resource was last in the session.

\* \* \* \* \*